United States Patent
Feng et al.

(10) Patent No.: US 12,386,599 B2
(45) Date of Patent: Aug. 12, 2025

(54) PAGE RENDERING METHOD, APPARATUS, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Kemian Feng, Shenzhen (CN); Fengmian Guo, Shenzhen (CN); Canhui Huang, Shenzhen (CN); Ruiying Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 214 days.

(21) Appl. No.: 18/189,194

(22) Filed: Mar. 23, 2023

(65) Prior Publication Data
US 2023/0229406 A1 Jul. 20, 2023

Related U.S. Application Data

(63) Continuation of application No. PCT/CN2022/090979, filed on May 5, 2022.

(30) Foreign Application Priority Data

May 28, 2021 (CN) .......................... 202110593334.4

(51) Int. Cl.
G06F 8/41 (2018.01)
(52) U.S. Cl.
CPC .................................. *G06F 8/433* (2013.01)

(58) Field of Classification Search
CPC ............... G06F 8/433; G06F 8/41; G06F 8/40
(Continued)

(56) References Cited

U.S. PATENT DOCUMENTS 11,474,796 B1 * 10/2022 Mather ...................... G06F 8/77
11,815,943 B1 * 11/2023 Rosendahl .............. G06F 9/547
(Continued)

FOREIGN PATENT DOCUMENTS

| CN | 106843869 A | 6/2017 |
| CN | 109358841 A | 2/2019 |

(Continued)

OTHER PUBLICATIONS

Li, English translation of CN 110400196 A, (Year: 2019).*
(Continued)

*Primary Examiner* — Bradley A Teets
*Assistant Examiner* — Zengpu Wei
(74) *Attorney, Agent, or Firm* — ANOVA LAW GROUP PLLC

(57) ABSTRACT

A page rendering method and apparatus. The method includes presenting a local compilation control, the local compilation control being directed to a page node to be locally compiled for a page to be viewed; obtaining a page node in response to a local compilation operation performed on the local compilation control; obtaining a code node corresponding to the page node of the page to be complied from a code dependency relationship, the code dependency relationship being constructed based on a dependency relationship between code files, and the code dependency relationship representing a hierarchical relationship between nodes corresponding to the code files; compiling a code file corresponding to the code node of the code to be complied to obtain a compiled code; and presenting the page to be
(Continued)

viewed corresponding to the page node of the page to be complied based on the compiled code.

19 Claims, 15 Drawing Sheets

(58) Field of Classification Search
USPC .......................................................... 717/156
See application file for complete search history.

(56) References Cited

U.S. PATENT DOCUMENTS

| | | | |
|---|---|---|---|
| 2010/0131951 A1 | 5/2010 | Carteri et al. | |
| 2015/0277861 A1* | 10/2015 | Jennings | G06F 8/41 717/148 |
| 2018/0349109 A1* | 12/2018 | Brown | G06N 20/00 |
| 2019/0073340 A1* | 3/2019 | Chuang | G06F 40/103 |
| 2020/0104122 A1* | 4/2020 | Pechacek | G06F 8/24 |
| 2020/0285488 A1* | 9/2020 | Yao | G06F 8/36 |
| 2021/0049007 A1* | 2/2021 | Nelluri | G06F 8/71 |
| 2021/0092195 A1 | 3/2021 | Fan et al. | |
| 2021/0096825 A1 | 4/2021 | Gray et al. | |
| 2021/0209491 A1 | 7/2021 | Liu et al. | |

FOREIGN PATENT DOCUMENTS

| | | | | |
|---|---|---|---|---|
| CN | 109375921 A | | 2/2019 | |
| CN | 110400196 A | * | 11/2019 | ............ G06F 9/451 |
| CN | 110795353 A | | 2/2020 | |
| CN | 111045683 A | | 4/2020 | |
| CN | 111651192 A | * | 9/2020 | |

OTHER PUBLICATIONS

Ning et al, English translation of CN 111651192 A, (Year: 2020).*
The European Patent Office (EPO) The Extended European Search Report for 22810323.0 Dec. 7, 2024 10 Pages.
The World Intellectual Property Organization (WIPO) International Search Report for PCT/CN2022/090979 Jul. 28, 2022 11 Pages (including translation).

* cited by examiner

PAGE RENDERING METHOD, APPARATUS, ELECTRONIC DEVICE, COMPUTER-READABLE STORAGE MEDIUM, AND COMPUTER PROGRAM PRODUCT

RELATED APPLICATIONS

This application is a continuation of PCT Application No. PCT/CN2022/090979, filed on May 5, 2022, which claims priority to Chinese Patent Application No. 202110593334.4 filed on May 28, 2021. The two applications are incorporated by reference in their entirety.

FIELD OF THE TECHNOLOGY

This application relates to the field of information processing technologies, and in particular, to a page rendering method and apparatus, an electronic device, a computer-readable storage medium and a computer program product.

BACKGROUND OF THE DISCLOSURE

Application development tools are tools for developing and debugging applications. An application development tool is used to compile code files, and implement the development and debugging of a specified page according to the compiled information, to improve the efficiency of development and debugging. However, when the application development tool is used to perform the compilation, the application development tool generally compiles all code files in the project where the specified page resides, resulting in a low compilation efficiency of the code files during the page rendering process and consequently a low page rendering efficiency.

SUMMARY

Embodiments of this application provide a page rendering method and apparatus, an electronic device, a computer-readable storage medium and a computer program product, which can improve the efficiency of page rendering.

Technical solutions in the embodiments of this application are implemented as follows:

One aspect of this application provides a page rendering method. The method includes presenting a local compilation control, the local compilation control being directed to a page node to be locally compiled for a page to be viewed; obtaining a page node of a page to be compiled in response to a local compilation operation performed on the local compilation control; obtaining a code node of a code to be compiled corresponding to the page node of the page to be compiled from a code dependency relationship, the code dependency relationship being constructed based on a dependency relationship between code files, and the code dependency relationship representing a hierarchical relationship between nodes corresponding to the code files; compiling a code file corresponding to the code node of the code to be compiled to obtain a compiled code; and presenting the page to be viewed corresponding to the page node of the page to be compiled based on the compiled code.

Another aspect of this application provides an electronic device for page rendering, which includes a memory, configured to store executable instructions; and a processor, configured to implement the page rendering method provided in the embodiments of this application by executing the executable instructions stored in the memory.

Another aspect of this application provides a computer-readable storage medium, which stores executable instructions which, when executed by a processor, implements the page rendering method provided in the embodiments of this application.

The embodiments of this application have the following beneficial effects. The code dependency relationship is constructed by analyzing the dependency relationship between code files in advance, so that when a page is to be presented, the page to be viewed can be presented by compiling the code file (code file to be compiled) that is related to the page to be viewed and obtained based on the code dependency relationship. Therefore, not all the code files need to be compiled, and the number of code files that need to be compiled is reduced. Therefore, the efficiency of information compilation in the process of page rendering is improved, thereby improving the efficiency of page rendering.

DESCRIPTION OF EMBODIMENTS

Figure 1A:
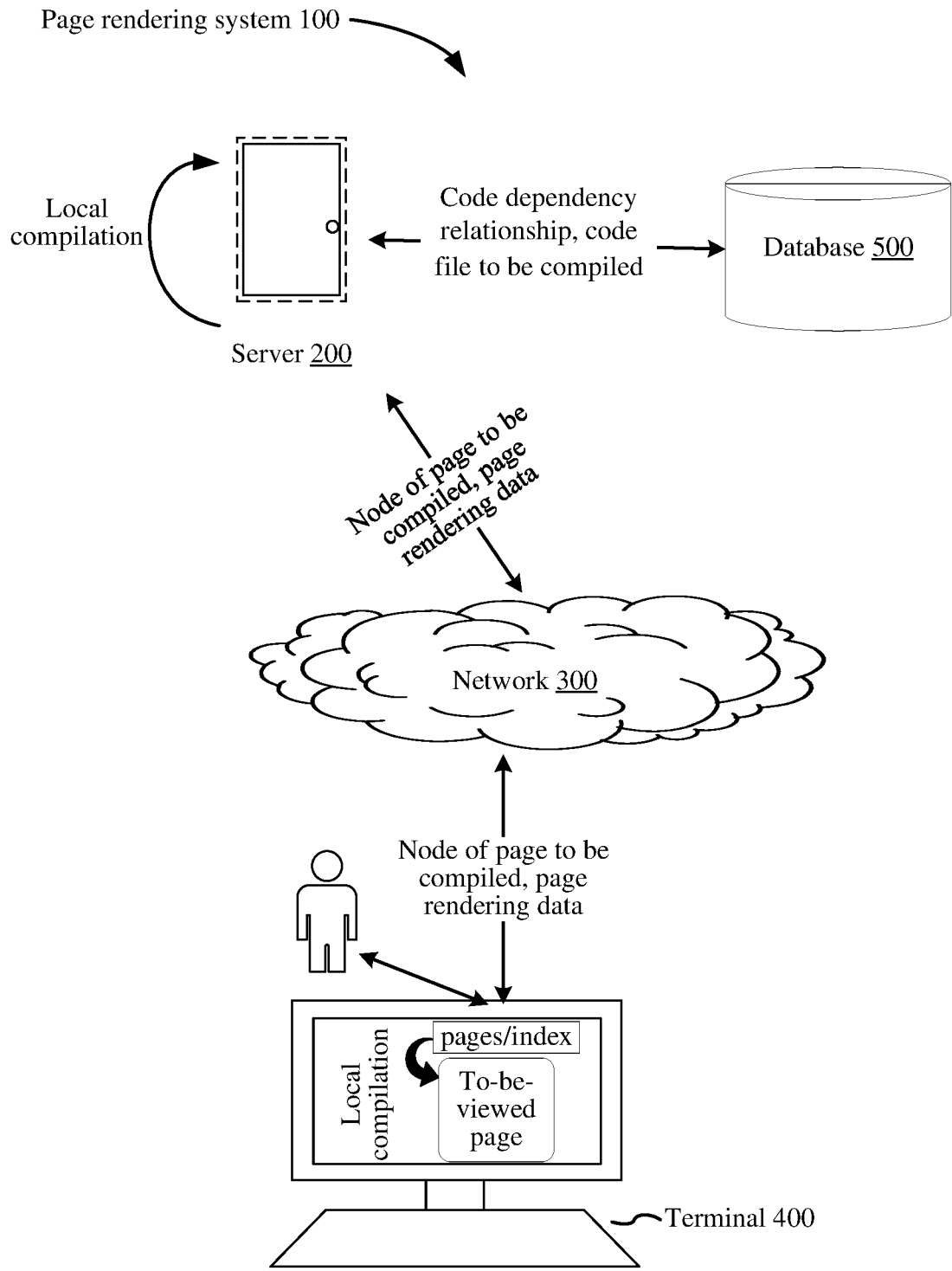
FIG. 1a is a schematic architectural diagram of a page rendering system according to an embodiment of the present application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in the embodiments of this application are the same as those usually understood by a person skilled in the art to which this application belongs. Terms used in the embodiments of this application are merely intended to describe objectives of the embodiments of this application, but are not intended to limit this application.

Before the embodiments of this application are further described in detail, nouns and terms involved in the embodiments of this application are described. For the nouns and terms provided in the embodiments of this application, the following explanations apply.

1) Code file: It is a type of information that is compiled to implement the corresponding function, such as a file in a "json", "wxml", "wxs", "wxss" or "js" format. A code file is usually composed of code. Compiling a code file means compiling the code in the code file. The code is a source file written by a programmer in a language supported by a development tool, and is a set of clear rule system that represents information in discrete form by characters, symbols or signal elements.

2) Compilation: It is a process of translating code designed in one programming language in a code file into another language (for example, a computer-readable language).

3) Preview: It is a process of uploading a code file corresponding to a project to an application platform (called a service device), for a developer to access the application platform to check the running effect of the project. A project is a functional application, for example, a subprogram application (e.g., mini program application), an application (APP), a website, and the like.

4) Mini Program (Mini Program), also known as mini program application: It is a type of application that can be used without being downloaded and installed. Generally, in order to provide users with more diversified services, developers can develop corresponding mini programs for functional applications in terminals (such as instant messaging applications, shopping applications, mail applications, and the like.). The mini program can be embedded into a functional application of a terminal as a sub-application. The sub-application can be run in the application (namely, corresponding mini program) to provide the users with the corresponding service.

5) Physical device debugging: It is a process of remotely debugging a project running in an application platform on the basis of preview.

6) Control: It is a type of triggerable information displaying in the form of a button, icon, link, text, selection box, input box, tab or the like. The information may be triggered in a contact manner, triggered in a non-contact manner, triggered by an instruction received, and so on. In addition, various controls in the embodiment of this application may be a single control or a general term for multiple controls.

7) Operation: It is a way to trigger a device to execute processing, and includes, for example, a click operation, double click operation, long press operation, sliding operation, gesture operation, received trigger instruction and the like. In addition, various operations in the embodiments of this application may be a single operation or a general term for multiple operations. Various operations in the embodiments of this application may be touch operations or non-touch operations.

8) In response to: This phrase is used to indicate a condition or state on which the executed processing depends. When the condition or state is satisfied, one or more operations executed may be implemented in real time or with a set delay. The order in which the operations are executed is not limited unless otherwise particularly stated.

In general, to implement code file compilation, an application development tool generally compiles all code files in a project where a specified page resides. For example, in the development stage of a subprogram application, when a developer checks the effect of a few pages under development, the application development tool loads all code files in the project (that is, code files corresponding to all pages) for compilation. The compilation takes a long time. For another example, in the preview and physical device debugging stage of a subprogram application, for a page to be previewed or debugged on a physical device, the application development tool loads and packages all the code files in the project for compilation and uploads the code files to a subprogram application background (application platform). The compilation takes a long time, and the uploaded code package is of a large volume, which takes a long time to upload.

Based on this, the embodiments of this application provide a page rendering method and apparatus, an electronic device, a computer-readable storage medium and a computer program product, which can improve the efficiency of information compilation, reduce the resource consumption of information compilation, reduce the volume of the code package uploaded, improve the efficiency of code package uploading, and therefore improve the efficiency of page rendering. Example applications of the electronic device provided in the embodiments of this application are described below. The electronic device provided in the embodiments of this application may be embodied as various types of terminals such as laptop computers, tablet computers, desktop computers, set-top boxes, mobile devices (e.g., mobile phones, portable music players, personal digital assistants, dedicated messaging devices, portable gaming devices) and the like. The electronic device may be embodied as a server, or may be embodied as a terminal and a server. An example application where the electronic device is embodied as a terminal and a server is described below.

Refer to FIG. 1a, which is a schematic architectural diagram of a page rendering system according to an embodiment of this application. As shown in FIG. 1a, to support a page rendering application, in a page rendering system 100, a terminal 400 is connected to a server 200 through a network 300 (where the terminal 400 and the server 200 together constitute an electronic device for page rendering in the embodiments of this application, hereinafter briefly referred to as a page rendering device). The network 300 can be a wide area network or a local area network, or a combination thereof. In addition, the page rendering system 100 further includes a database 500 configured to send a code dependency relationship and a code file to be compiled to the server 200. The code dependency relationship is constructed based on a dependency relationship between code files, and the code dependency relationship represents a hierarchical relationship between nodes corresponding to the code files.

The terminal 400 is configured to present a local compilation control, where the local compilation control is used for setting a page node to be locally compiled for a page to be viewed; obtain a page node of the page to be compiled (for example, "pages/index") in response to a local compilation operation performed on the local compilation control, and send the page node of the page to be compiled to the server 200 through the network 300; and receive page rendering data sent by the server 200 for the page node of the page to be compiled through the network 300, and present the page to be viewed corresponding to the page node of the page to be compiled based on the page rendering data.

The server 200 is configured to receive the page node of the page to be compiled sent by the terminal 400 through the network 300, and obtain a code node of the code to be compiled corresponding to the page node of the page to be compiled from the code dependency relationship; locally compile a code file to be compiled corresponding to the code node of the code to be compiled to obtain the compiled code; send, based on the compiled code, the page rendering data to the terminal 400 through the network 300.

In some embodiments, the server 200 may be an independent physical server or a server cluster or distributed system composed of multiple physical servers; and may also be a cloud server that provides cloud service, cloud database, cloud computing, cloud function, cloud storage, network service, cloud communication, middleware service, domain name service, security service, content delivery network (CDN), big data and artificial intelligence platform and other basic cloud computing services. The terminal 400 may be a smartphone, a tablet computer, a notebook computer, a desktop computer, a smart speaker, a smartwatch, or the like, but is not limited thereto. The terminal and the server may be connected directly or indirectly through wired or wireless communication, which is not limited in the embodiments of this application.

Figure 1B:
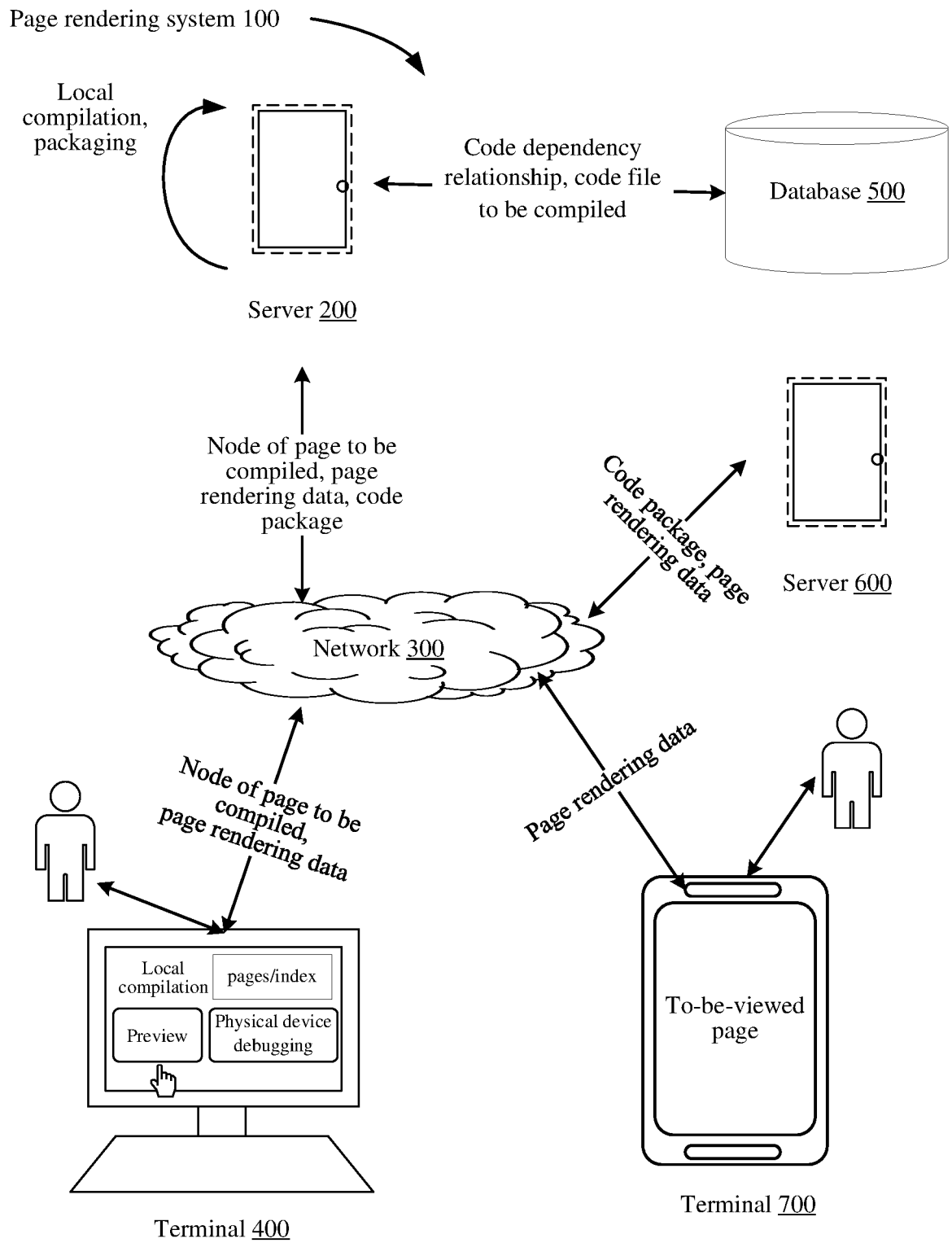
FIG. 1b is another schematic architectural diagram of a page rendering system according to an embodiment of the present application.

Refer to FIG. 1b which is another schematic architectural diagram of a page rendering system according to an embodiment of the present application. As shown in FIG. 1b, based on FIG. 1a, the server 200 is further configured to package the compiled code during preview or physical device debugging through the terminal 400. Therefore, the page rendering system 100 further includes a server 600 (service device) and a terminal 700. The server 600 obtains a code package sent by server 200 through the network 300, and sends page rendering data for presenting a page to be viewed to the terminal 700 through the network 300, so that terminal 700 presents the page to be viewed.

Figure 2:
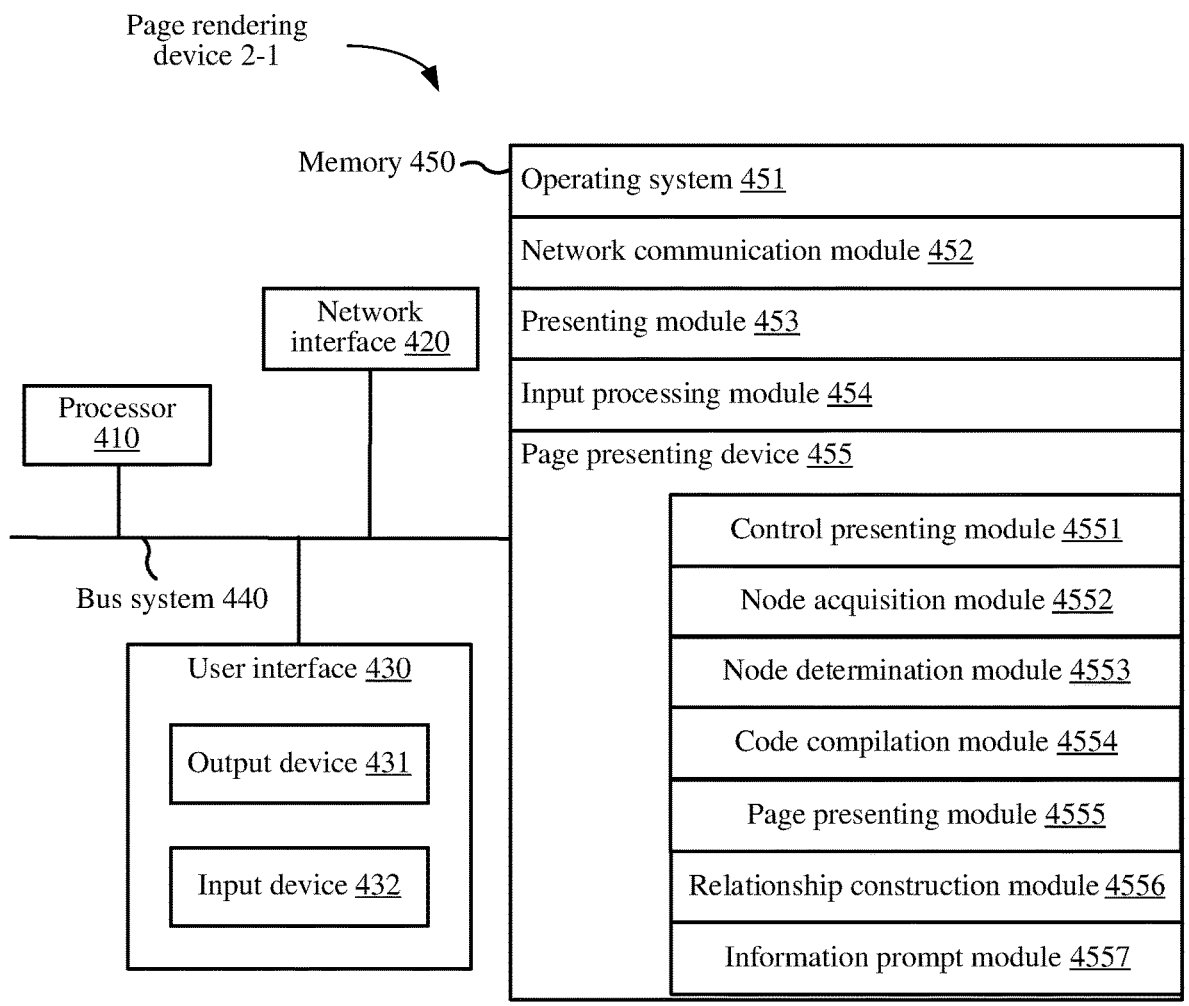
FIG. 2 is a schematic structural diagram of a page rendering device according to an embodiment of this application.

Refer to FIG. 2, which is a schematic structural diagram of a page rendering device according to an embodiment of this application. The page rendering device 2-1 shown in FIG. 2 includes: at least one processor 410, a memory 450, at least one network interface 420 and a user interface 430. The components in the page rendering device 2-1 are coupled together by a bus system 440. It may be understood that, the bus system 440 is configured to implement connection and communication between the components. In addition to a data bus, the bus system 440 further includes a power bus, a control bus, and a state signal bus. For clarity of description, all the buses in FIG. 2 are marked as the bus system 440.

The processor 410 may be an integrated circuit chip with signal processing capabilities, such as a general-purpose processor, digital signal processor (DSP), or other programmable logic device, discrete gate or transistor logic device, discrete hardware component, and the like. The general-purpose processor may be a microprocessor or any conventional processor.

The user interface 430 includes one or more output devices 431 capable of presenting media content, including one or more speakers and/or one or more visual displays. The user interface 430 further includes one or more input devices 432, including user interface components that facilitate user input, such as a keyboard, mouse, microphone, touch screen display, camera, other input buttons and controls.

The memory 450 may be removable, non-removable, or a combination thereof. Examples of hardware devices include a solid-state memory, a hard disk drive, an optical disc drive, and the like. The memory 450 includes one or more storage devices physically located remotely from the processor 410.

The memory 450 may be a volatile memory or a non-volatile memory, or may include both a volatile memory and a non-volatile memory. The non-volatile memory may be a read only memory (ROM), and the volatile memory may be a random access memory (RAM). The memory 450 described in the embodiments of this application is intended to include any suitable type of memory.

In some embodiments, the memory 450 is capable of storing data to support various operations. Examples of such data include a program, module, and data structure or a subset or superset thereof. For example, the memory includes:

an operating system 451, including various system programs for processing various basic system services and performing hardware-related tasks, for example, a framework layer, a core library layer, and a drive layer, to implement various basic services and process hardware-based tasks;

a network communication module 452, configured to communicate with another computer device through one or more (wired or wireless) network interfaces 420, where examples of the network interface 420 include: Bluetooth, Wireless Fidelity (Wi-Fi), and Universal Serial Bus (USB) interfaces and the like;

a presenting module 453, configured to present information through one or more output devices 431 (such as a display, speaker, and the like) associated with the user interface 430 (for example, a user interface for operating a peripheral device and displaying content and information); and an input processing module 454, configured to detect one or more user inputs or interactions from one or more of the one or more input devices 432 and translate the detected inputs or interactions.

In some embodiments, a page rendering apparatus according to the embodiments of this application can be implemented by software. FIG. 2 shows a page rendering apparatus 455 stored in the memory 450, which may be software in the form of a program, plug-in or the like, including the following software modules: a control presenting module 4551, a node acquisition module 4552, a node determination module 4553, a code compilation module 4554, a page rendering module 4555, a relationship construction module 4556 and an information prompt module 4557. These modules are logical and therefore may be arbitrarily combined or further divided according to the functions realized. The functions of the modules will be described below.

In some embodiments, a program corresponding to a page may be a native applications (APP), that is, a program that can run only after being installed in the operating system, such as a video APP or live-streaming APP; may be a mini program, that is, a program that can run after being downloaded into a browser environment, such as video mini program, a live-streaming mini program; or may be a video mini program or live-streaming mini program that can be embedded into any APP. In summary, the program corresponding to the page can be any form of application, module, or plug-in.

The page rendering method provided in the embodiments of this application will be described below in conjunction with example applications and implementations provided in the embodiments of this application.

Figure 3:
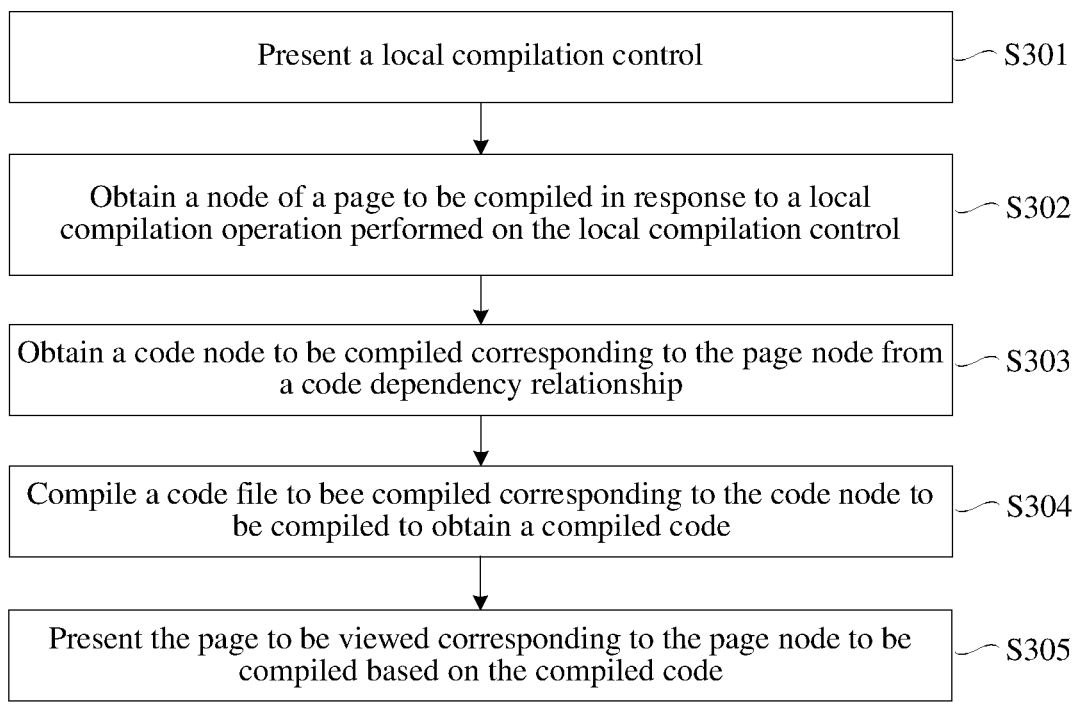
FIG. 3 is a schematic flowchart of a page rendering method according to an embodiment of this application.

Refer to FIG. 3, which is a schematic flowchart of a page rendering method according to an embodiment of this application. The method is described in conjunction with the steps shown in FIG. 3.

S301. Present a local compilation control.

In an embodiment of this application, when a page rendering device runs an application development tool and starts a local compilation process, the page rendering device obtains a page node to be locally compiled by presenting a local compilation control. That is, the local compilation control is used for setting the page node to be locally compiled for a page to be viewed. One page node is determined for each page, so that the page corresponds to the page node.

The local compilation control may be presented on a page or pop-up box used for setting compilation information, or on a page used for compiling a code file, and so on. The form in which the local compilation control is presented is not limited in the embodiments of this application. The local compilation control may also have corresponding prompt information, such as, "for local development and preview, compile the following pages only:" or "Please input a page that requires local compilation" and the like. The local compilation control may be an input box, a selection box, a list of selectable pages, and the like. The form of the local compilation control is not limited in the embodiments of this application.

S302. Obtain a page node of the page to be compiled in response to a local compilation operation performed on the local compilation control.

In an embodiment of this application, when a user specifies a page to be edited locally through the local compilation control, the page rendering device obtains the local compilation operation performed on the local compilation control. In this case, the page rendering device can obtain a page node corresponding to the input page that requires local compilation in response to the local compilation operation. The page node corresponding to the page that requires local compilation is the page node of the page to be compiled.

The local compilation operation is an operation of triggering the local compilation control to determine the page node to be locally compiled, for example, an operation of inputting or selecting a page node through the local compilation control. Therefore, the page rendering device can obtain the page node to be locally compiled, that is, the page node of the page to be compiled, by responding to the local compilation operation. The page node of the page to be compiled includes at least one page node, for example, at least one of a page node "pages/index", a page node "pages/logs", and a page node "pages/details".

S303. Obtain a code node of the code to be compiled corresponding to the page node of the page to be compiled from a code dependency relationship.

In an embodiment of this application, the page rendering device can obtain the code dependency relationship. The code dependency relationship is constructed based on a dependency relationship between code files, and the code dependency relationship represents a hierarchical relationship between nodes corresponding to the code files. Therefore, after obtaining the page node of the page to be compiled, the page rendering device can determine the node of the code file associated with the page node of the page to be compiled in the code dependency relationship, where the node of the code file associated with the page node of the page to be compiled is the code node of the code to be compiled. Herein, one node, that is, code node, is determined for each code file, so that the code file corresponds to the code node.

The code dependency relationship may include page nodes and code nodes, the page nodes are associated with the code nodes, and there is a dependency relationship between the code nodes. The code dependency relationship may further include nodes corresponding to application-level code files in a functional application to be developed. Therefore, the code node of the code to be compiled may include the code node associated with the page node of the page to be compiled, and may also include at least one of a code node on which the code node associated with the page node of the page to be compiled depends, and the nodes corresponding to the application-level code files in the functional application to be developed, which is not limited in the embodiments of this application.

For example, when the page node of the page to be compiled is the page node "pages/index", the code node of the code to be compiled includes nodes "app.js", "app.json" and "app.wxss" corresponding to the application-level code files and code nodes "index.js", "index.json", "index.wxml", and "index.wxss" associated with the page node of the page to be compiled.

S304. Compile a code file to be compiled corresponding to the code node of the code to be compiled to obtain a compiled code.

In an embodiment of this application, because the code node of the code to be compiled includes at least one node, and each node corresponds to one code file, the page rendering device can obtain at least one code file corresponding to the code node of the code to be compiled, where the at least one code file corresponding to the code node of the code to be compiled is the code file to be compiled. The page rendering device compiles the code file to be compiled, and the result of the compilation is the compiled code, that is, the compiled code is the compiled code file to be compiled. In addition, the page rendering device can compile the code file to be compiled through a compilation module in the application development tool.

S305. Present the page to be viewed corresponding to the page node of the page to be compiled based on the compiled code.

In an embodiment of this application, the page rendering device presents a page by executing an instruction corresponding to the compiled code, where the page presented by executing the instruction corresponding to the compiled code is the page to be viewed corresponding to the page node of the page to be compiled. The page to be viewed may be a page under development in the development stage, a page in the preview stage, a page in the physical device debugging stage, and so on, which is not limited in the embodiments of this application.

Figure 4:
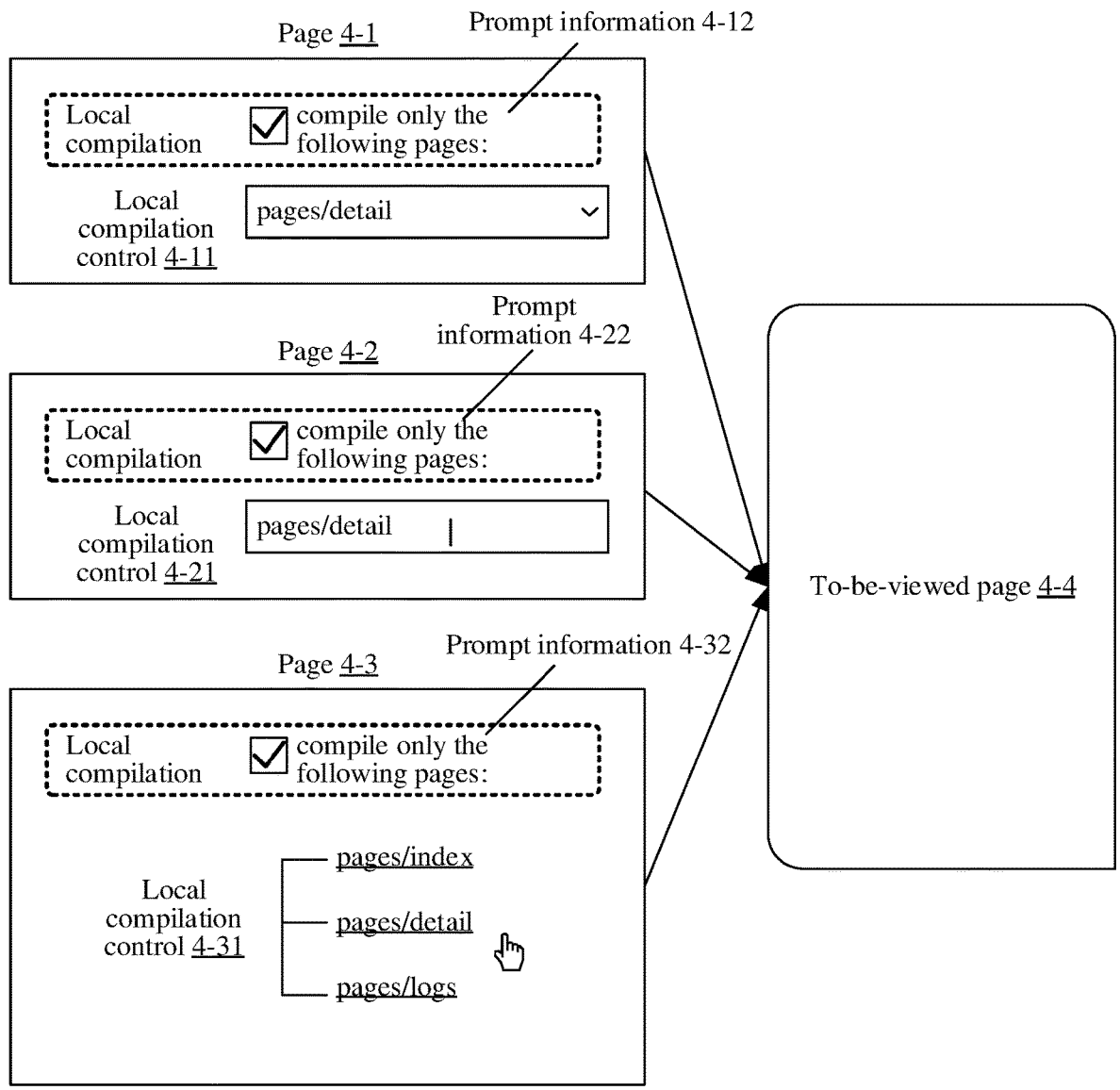
FIG. 4 is a schematic diagram of an embodiment of presenting a page to be viewed according to an embodiment of this application.

For example, refer to FIG. 4, which is a schematic diagram of an embodiment of presenting a page to be viewed according to an embodiment of this application. As shown in FIG. 4, a local compilation control 4-11 and prompt information 4-12 are presented on a page 4-1; a local compilation control 4-21 and prompt information 4-22 are presented on a page 4-2; and a local compilation control 4-31 and prompt information 4-32 are presented on a page 4-3. By selecting the page node of the page to be compiled "pages/detail" in the local compilation control 4-11, or inputting the page node of the page to be compiled "pages/detail" in the local compilation control 4-21, or selecting the page node of the page to be compiled "pages/detail" in the local compilation control 4-31, presenting of the page to be viewed 4-4 can be realized.

It can be understood that, based on an analysis result of the dependency relationship between code files and the page currently under development (corresponding to the page node of the page to be compiled), a relevant code file (code file to be compiled) can be determined and compiled. Because not all code files need to be compiled, the number of code files compiled in the compilation process can be reduced, thereby increasing the compilation speed and reducing the compilation time. Therefore, the smoothness of compilation in the process of page rendering can be improved, thereby improving the efficiency of page rendering and the efficiency of functional application development.

Figure 5:
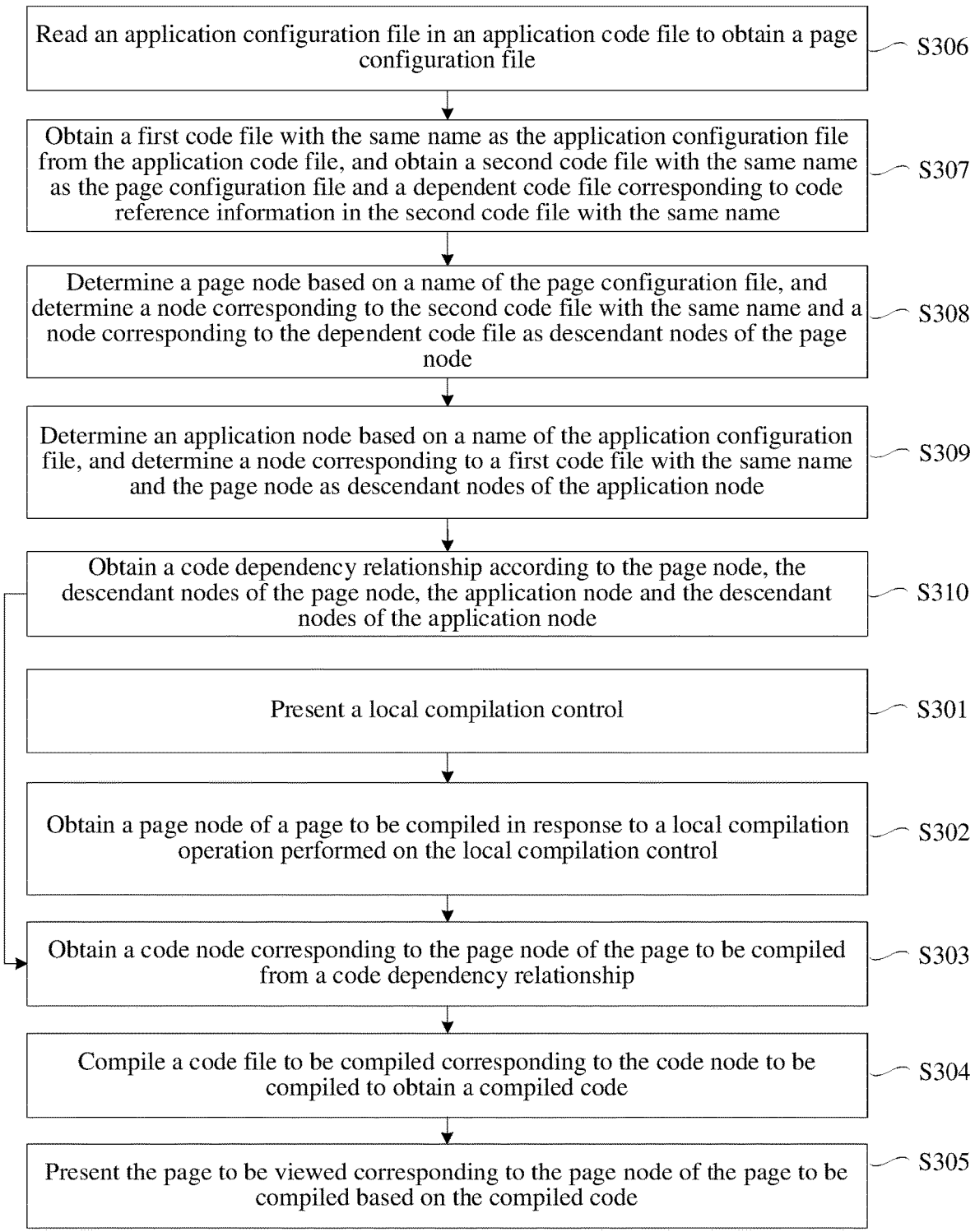
FIG. 5 is another schematic flowchart of a page rendering method according to an embodiment of this application.

Refer to FIG. 5, which is another schematic flowchart of a page rendering method according to an embodiment of this application. As shown in FIG. 5, in an embodiment of this application, the method further includes S306 to S310 before S303. That is to say, before the page rendering device obtains the code node of the code to be compiled corresponding to the page node of the page to be compiled from the code dependency relationship, the page rendering method further includes S306 to S310. The steps are described separately below.

S306. Read an application configuration file in an application code file to obtain a page configuration file.

The application code file is all code files of a functional application to be developed, including a code file corresponding to application-level configuration information of the functional application to be developed. The code file corresponding to the application-level configuration information of the functional application to be developed is the application configuration file, for example, "app.json" code file.

In an embodiment of this application, the page rendering device can also obtain the application configuration file based on code file directory structure information. The code file directory structure information refers to a directory structure corresponding to the code file of the functional application to be developed. The code file directory structure information includes a configuration file identifier of the functional application to be developed. A corresponding code file is obtained based on the configuration file identifier. In this case, the obtained code file corresponding to the configuration file identifier is the application configuration file.

Figure 6A:
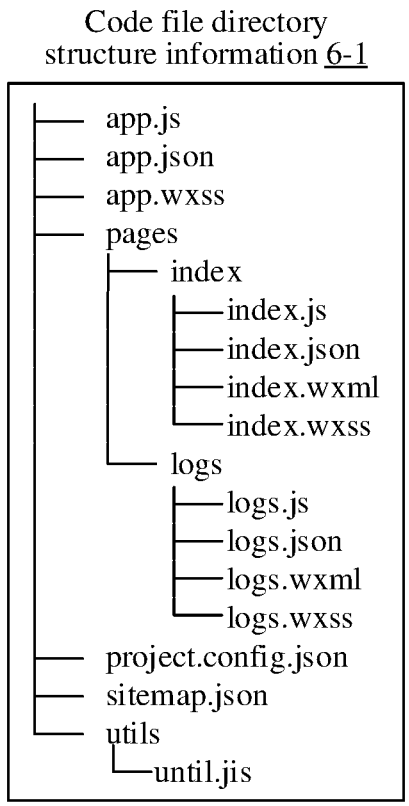
FIG. 6a is a schematic diagram of an embodiment of a code file directory structure according to an embodiment of this application.

For example, refer to FIG. 6a, which is a schematic diagram of an embodiment of code file directory structure information according to an embodiment of this application. As shown in FIG. 6a, code file directory structure information 6-1 is a directory structure of a code file of a subprogram application containing two pages (a main "index" page and a log "logs" page). A first-level directory includes names of code files of the subprogram application that are not corresponding to pages: "app.js", "app.json", "app.wxss", "project.config.json", "sitemap.json", . . . , where the code file corresponding to app.json (configuration file identifier is the application configuration file.

In an embodiment of this application, the application configuration file contains information about a configuration file corresponding to a page of the functional application to be developed. The page rendering device reads the information about the configuration file corresponding to the page of the functional application to be developed in the application configuration file, and obtains the corresponding code file, i.e., the page configuration file, based on the read information about the configuration file corresponding to the page of the functional application to be developed.

S307. Obtain a first code file with the same name as the application configuration file from the application code file, and obtain a second code file with the same name as the page configuration file and a dependent code file corresponding to code reference information in the second code file with the same name.

A name of the application configuration file includes a file name and a code type. For example, in app.json, "app" represents the file name and ".json" represents the code type. The page rendering device reads the application code file based on the file name of the application configuration file, determines a code file with the same name as that of the application configuration file from the application code file, and determines the determined code file with the same name as that of the application configuration file as the first code file with the same name, for example, code files respectively corresponding to "app.js" and "app.wxss" that have the same name as "app" in "app.json".

In an embodiment of this application, the page rendering device can also obtain the first code file with the same name based on code file directory structure information. The page rendering device obtains a target level of the configuration file identifier from the code file directory structure information, obtains a code file corresponding to an identifier at the target level other than an identifier of a page associated code file, and determines the code file corresponding to the identifier at the target level other than the identifier of the page associated code file as the first code file with the same name. The application code file corresponds to the code file directory structure information.

For example, still referring to FIG. 6a, at the target level of the configuration file identifier, the identifier other than the identifier of the page associated code file is: "app.js", "app.json", "app.wxss", "project.config.json", and "sitemap.json".

A name of the page configuration file includes a file name and a code type. The page rendering device reads the application code file based on the file name of the page configuration file, determines a code file with the same name as that of the page configuration file from the application code file, and determines the determined code file with the same name that of the page configuration file as the second code file with the same name, for example, code files respectively corresponding to "index.js", "index.wxml" and "index.wxss" that have the same name as "index" in "index.json", or code files respectively corresponding to "logs.js", "logs.wxml" and "logs.wxss" that have the same name as "logs" in "logs.json".

In an embodiment of this application, the page rendering device reads the second code file with the same name. When obtaining the code reference information, the page rendering device determines a referenced code file based on a name of the referenced code file in the code reference information, where the referenced code file is the dependent code file. For example, a code file referenced by the "logs.js" code file (the second code file with the same name) is a code file "util.js" in a path "util".

S308. Determine a page node based on the name of the page configuration file, and determine a node corresponding to the second code file with the same name and a node corresponding to the dependent code file as descendant nodes of the page node.

In an embodiment of this application, the page node may be a file name in the name of the page configuration file, or the name of the page configuration file, or a combination of the file name and path in the name of the page configuration file, or the like, which is not limited in the embodiments of this application. The path of the page configuration file may be determined based on code file directory structure information. For example, when the page configuration file is the code file corresponding to "index.json", the corresponding page node can be "pages/index". For another example, when the page configuration file is the code file corresponding to "logs.json", the corresponding page node can be "pages/logs". The node corresponding to the second code file with the same name may be a name of the second code file with the same name, and the node corresponding to the dependent code file may be a combination of a name and path of the dependent code file. The path of the dependent code file may be determined based on code file directory structure information.

The node corresponding to the second code file with the same name and the node corresponding to the dependent code file are descendant nodes of the page node, where the node corresponding to the dependent code file is a descendant node of the node corresponding to the second code file with the same name.

S309. Determine an application node based on the name of the application configuration file, and determine a node corresponding to the first code file with the same name and the page node as descendant nodes of the application node.

In an embodiment of this application, the application node may be a file name in the name of the application configuration file, or the name of the application configuration file name, or a combination of the file name and path in the name of the application configuration file, or the like, which is not limited in the embodiments of this application. The path of the application configuration file may be determined based on code file directory structure information. For example, when the application configuration file is the code file corresponding to "app.json", the corresponding application node may be "app". The node corresponding to the first code file with the same name may be a name of the first code file with the same name.

S310. Obtain the code dependency relationship according to the page node, the descendant nodes of the page nodes, the application node and the descendant nodes of the application node.

In an embodiment of this application, after determining the descendant nodes of the application node, the page rendering device obtains a relationship between the page node, the descendant nodes of the page node, the application node and the descendant nodes of the application node as the code dependency relationship.

The code dependency relationship is a hierarchical relationship between the application node, the node corresponding to the first code file with the same name, the page node, the node corresponding to the second code file with the same name and the node corresponding to the dependent code file. That is to say, the hierarchical relationship is: the node corresponding to the first code file with the same name and the page node are descendant nodes of the application node, the node corresponding to the second code file with the same name is a descendant node of the page node, and the node corresponding to the dependent code file is a descendant node of the node corresponding to the second code file with the same name.

It can be understood that the construction of the code dependency relationship by analyzing the dependency relationship between code files in advance provides data support for local compilation of code files.

Figure 6B:
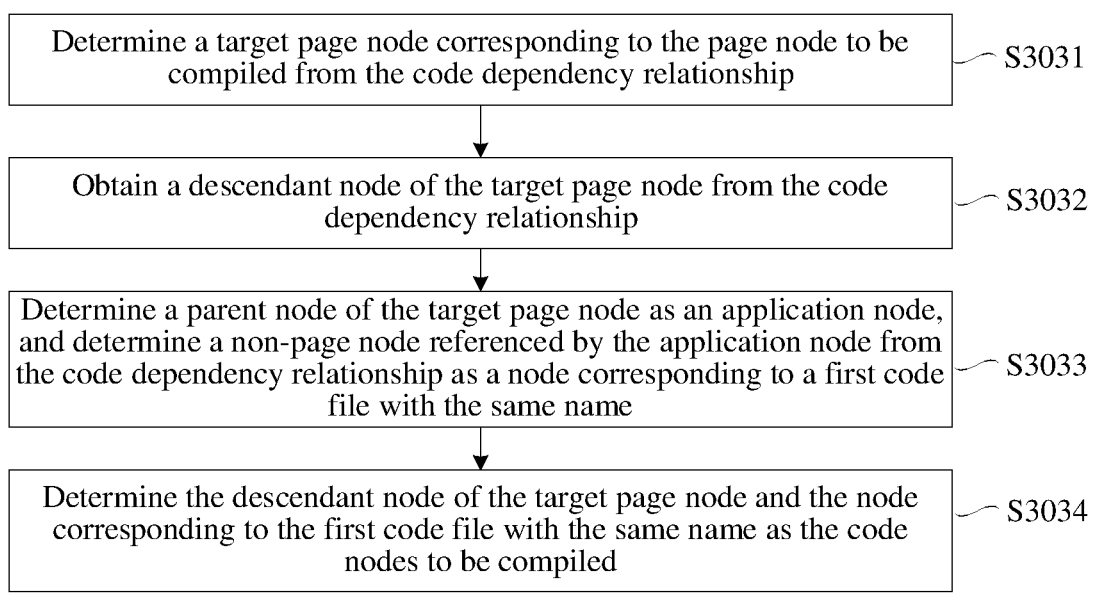
FIG. 6b is a schematic flowchart of obtaining a code node of the code to be compiled according to an embodiment of this application.

Refer to FIG. 6b, which is a schematic flowchart of obtaining a code node of the code to be compiled according to the embodiment of this application. As shown in FIG. 6b, in an embodiment of this application, S303 may be realized through S3031 to S3034. That is to say, from code dependency relationship, the page rendering device obtains code node of the code to be compiled which correspond to page node of the page to be compiled, including S3031 to S3034. Each step is explained separately below.

S3031. From the code dependency relationship, determine a target page node corresponding to the page node of the page to be compiled.

In an embodiment of this application, when determining the code node of the code to be compiled from the code dependency relationship based on the page node of the page to be compiled, the page rendering device first locates the page node corresponding to the page node of the page to be compiled in the code dependency relationship, and the located page node corresponding to the page node of the page to be compiled is the target page node.

S3032. Get a descendant node of the target page node from the code dependency relationship.

The descendant node of the target page node includes a node of a second code file of the same name corresponding to the target page node, and may also include a node of the dependent code file corresponding to the second code file of the same name corresponding to the target page node.

S3033. Determine a parent node of the target page node as an application node, and determine a non-page node referenced by the application node from the code dependency relationship as a node corresponding to a first code file with the same name.

In an embodiment of this application, on the one hand, the page rendering device obtains the descendant node of the target page node from the code dependency relationship; on the other hand, the page rendering device also obtains the non-page node referenced by the application node from the code dependency relationship, and the non-page node referenced by the application node is a node corresponding to the first code file with the same name.

S3034. Determine the descendant node of the target page node and the node corresponding to the first code file with the same name as the code node of the code to be compiled.

The code node of the code to be compiled includes the descendant node of the target page node and the node corresponding to the first code file with the same name. The descendant node of the target page node includes the node corresponding to the second code file with the same name, or the descendant node of the target page node includes the node corresponding to the second code file with the same name and the node corresponding to the dependent code file.

Figure 6C:
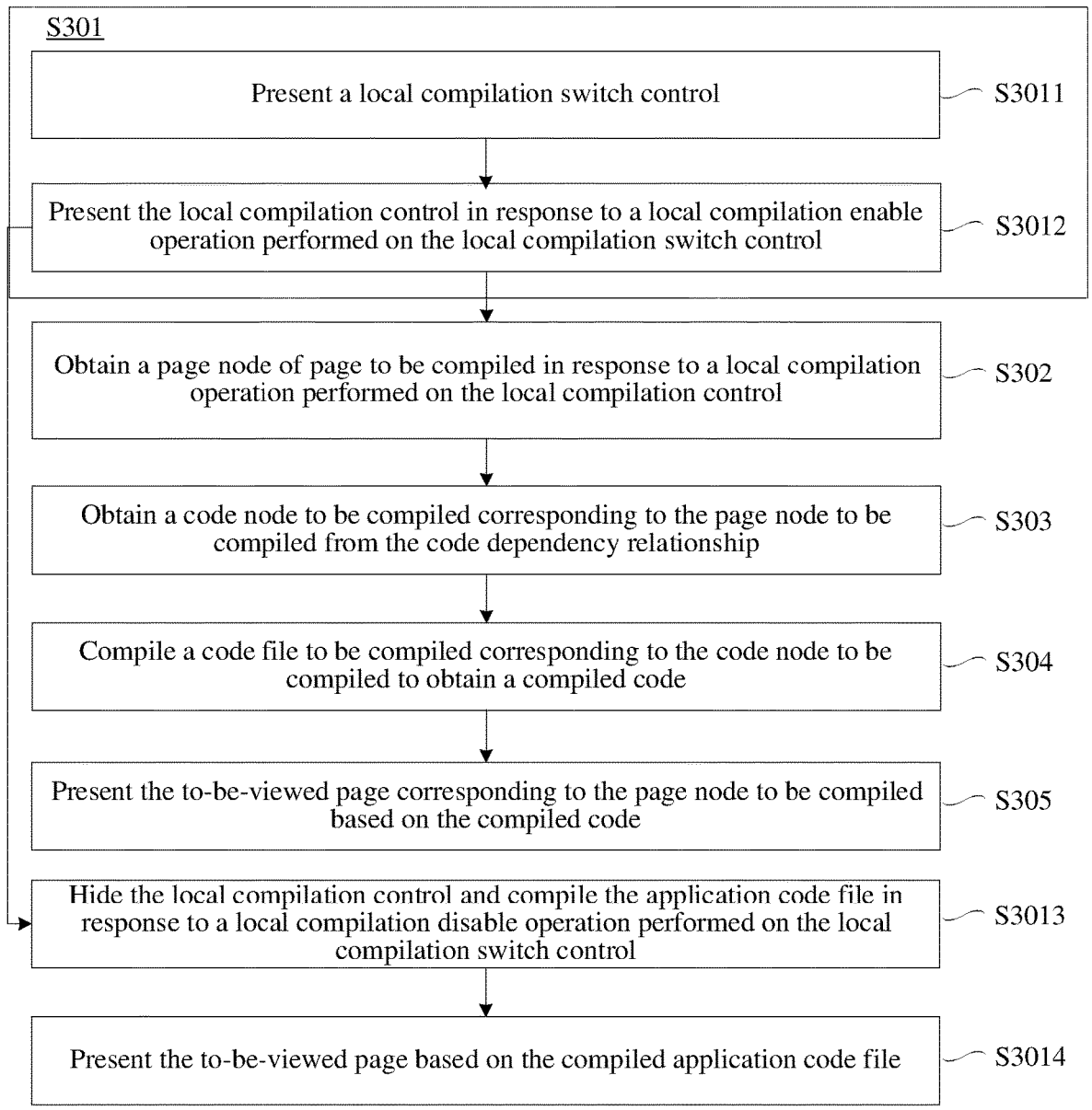
FIG. 6c is still another schematic flowchart of a page rendering method according to an embodiment of this application.

Refer to FIG. 6c, which is another schematic flowchart of the page rendering method according to the embodiment of this application. As shown in FIG. 6c, in an embodiment of this application, S301 may be realized through S3011 and S3012. In other words, the presenting of the local compilation control by the page rendering device includes S3011 and S3012. The steps are described below.

S3011. Present a local compilation switch control.

When running the application development tool, the page rendering device may first present a control used for setting a compilation mode of a code file. The control used for setting the compilation mode of the code file is the local compilation switch control. The local compilation switch control may be a selection box for global compilation and local compilation, may be a check box for local compilation, and so on. The form of the local compilation switch control is not limited in the embodiments of this application. The compilation mode includes a local compilation mode and a global compilation mode.

S3012. Present the local compilation control in response to a local compilation enable operation performed on the local compilation switch control.

In an embodiment of this application, when the user enables the local compilation mode by triggering the local compilation switch control, the page rendering device receives the local compilation enable operation performed on the local compilation switch control. In this case, in response to the local compilation enable operation, the page rendering device presents the local compilation control used for obtaining the page node of the page to be compiled, to enter the local compilation mode.

The local compilation control may be presented directly, or based on the local compilation enable operation performed on the local compilation switch control, and so on, which is not limited in the embodiments of this application.

Still referring to FIG. 6c, in an embodiment of this application, the method further includes S3013 and S3014 after S3012. That is, after the page rendering device presents the local compilation control in response to the local compilation enable operation performed on the local compilation switch control, the page rendering method further includes S3013 and S3014. The steps are described separately below.

S3013. Hide the local compilation control and compile the application code file in response to a local compilation disable operation performed on the local compilation switch control.

In an embodiment of this application, when the user triggers the local compilation switch control to disable the local compilation mode or enable the global compilation mode, the page rendering device receives the local compilation disable operation performed on the local compilation switch control. In this case, the page rendering device hides the local compilation control and enters the global compilation mode to compile the application code file, in response to the local compilation disable operation.

S3014. Present the page to be viewed based on the compiled application code file.

In the global compilation mode, all code files (application code files) are compiled, and the page to be viewed is presented based on all the compiled code files (compiled application code files).

In an embodiment of this application, after the page rendering device presents the local compilation control in S301, the page rendering method further includes: in response to failure in obtaining a page node based on the presented local compilation control, compiling, by the page rendering device, the application code file and presenting the page to be viewed based on the compiled application code file.

If the page rendering device fails to obtain the page node of the page to be compiled based on the local compilation control, it indicates that the page node obtaining fails, and the page rendering device performs global compilation, not local compilation. In this case, the page rendering device compiles the application code file and presents the page to be viewed based on the compiled application code file.

In an embodiment of this application, when presenting the local compilation switch control, the page rendering device can determine, based on the local compilation switch control, whether the compilation mode is the local compilation mode or the global compilation mode. When presenting the local compilation control, the page rendering device can determine whether the compilation mode is the local compilation mode or the global compilation mode, based on whether the local compilation control successfully obtains a page node of the page to be compiled. To be specific, if a page node of the page to be compiled is successfully obtained, the local compilation mode is entered; if no page node of the page to be compiled is obtained, the global compilation mode is entered.

Figure 6D:
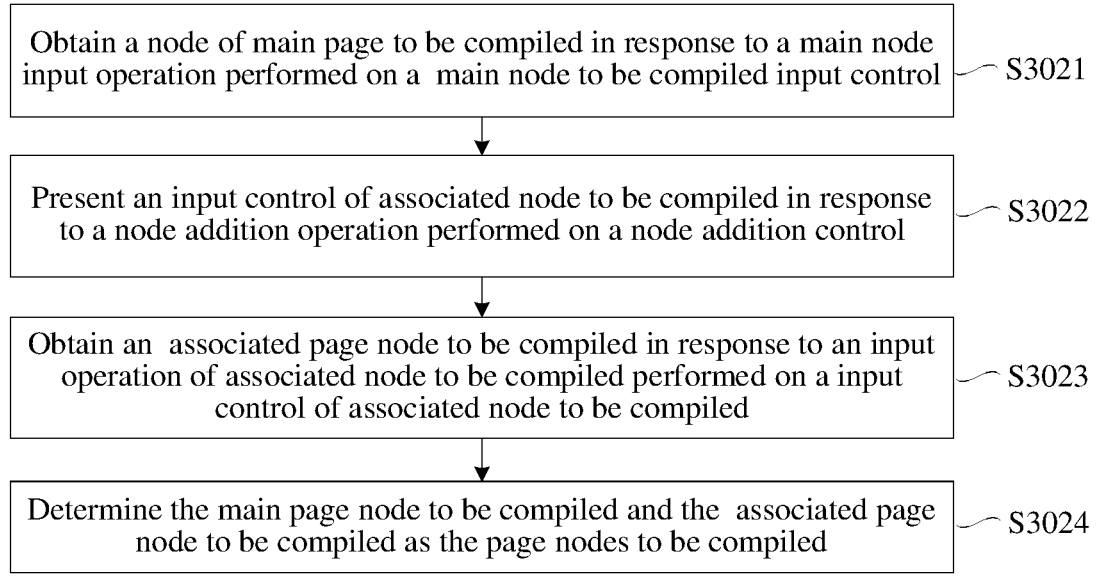
FIG. 6d is a schematic flowchart of obtaining a page node of the page to be compiled according to an embodiment of this application.

Refer to FIG. 6d, which is a schematic flowchart of obtaining a page node of the page to be compiled according to an embodiment of this application. As shown in FIG. 6d, in an embodiment of this application, S302 may be realized through S3021 to S3024. That is, the obtaining of the page node of the page to be compiled by the page rendering device in response to the local compilation operation performed on the local compilation control includes S3021 and S3024. The steps are described separately below.

S3021. Obtain a main page node to be compiled in response to an input operation performed on a input control of the main node to be compiled.

In an embodiment of this application, the local compilation control includes the input control of the main node to be compiled. Through the input control of the main node to be compiled, the page rendering device obtains a page node corresponding to the page to be presented, which is called the main page node to be compiled.

S3022. Present a input control of the associated node to be compiled in response to a node addition operation performed on a node addition control.

In an embodiment of this application, the local compilation control further includes the node addition control. Through the node addition control, the page rendering device presents a control used for obtaining a page node corresponding to a page associated with the main node to be compiled, where the control used for obtaining the page node corresponding to the page associated with the main node to be compiled is the input control of the associated node to be compiled. The page associated with the main page node to be compiled is, for example, a page to jump to, a page to return, and the like.

S3023. Obtain a associated page node to be compiled in response to a associated node to be compiled input operation performed on the input control of the associated node to be compiled.

In an embodiment of this application, when the user triggers the input control of the associated node to be compiled to input the page node corresponding to the page associated with the main page node to be compiled, the page rendering device receives the associated node to be compiled input operation performed on the input control of the associated node to be compiled. The associated node to be compiled input operation is an operation of inputting the page node corresponding to the page associated with the main page node to be compiled through the input control of the associated node to be compiled. In this case, in response to the associated node to be compiled input operation, the page rendering device can obtain the page node corresponding to the page associated with the inputted node of the main page to be compiled. The page node corresponding to the page associated with the main page node to be compiled is the associated page node to be compiled.

The local compilation control includes the input control of the main node to be compiled and the node addition control. The local compilation operation includes the main node to be compiled input operation and the node addition operation.

S3024. Determine the main page node to be compiled and the associated page node to be compiled as the page node of the page to be compiled.

The page node of the page to be compiled include the main page node to be compiled and the associated page node to be compiled.

In an embodiment of this application, after the obtaining of the page node of the page to be compiled by the page rendering device in response to the local compilation operation performed on the local compilation control in S302, the page rendering method further includes: presenting, by the page rendering device, local compilation prompt information during compilation based on the page node of the page to be compiled.

The local compilation prompt information includes at least one of local compilation title prompt information and local compilation status prompt information. The local compilation title prompt information is local compilation mode prompt information displayed in the form of a title, and the local compilation status prompt information is local compilation mode prompt information presented for the presented compilation process.

It is understood that presenting the local compilation prompt information during the compilation process not only can improve the information presenting effect of page rendering, but also allows for the timely determination of the compilation mode and reduces human-machine interactions for determining the compilation mode, thereby improving the efficiency of information compilation.

Figure 6E:
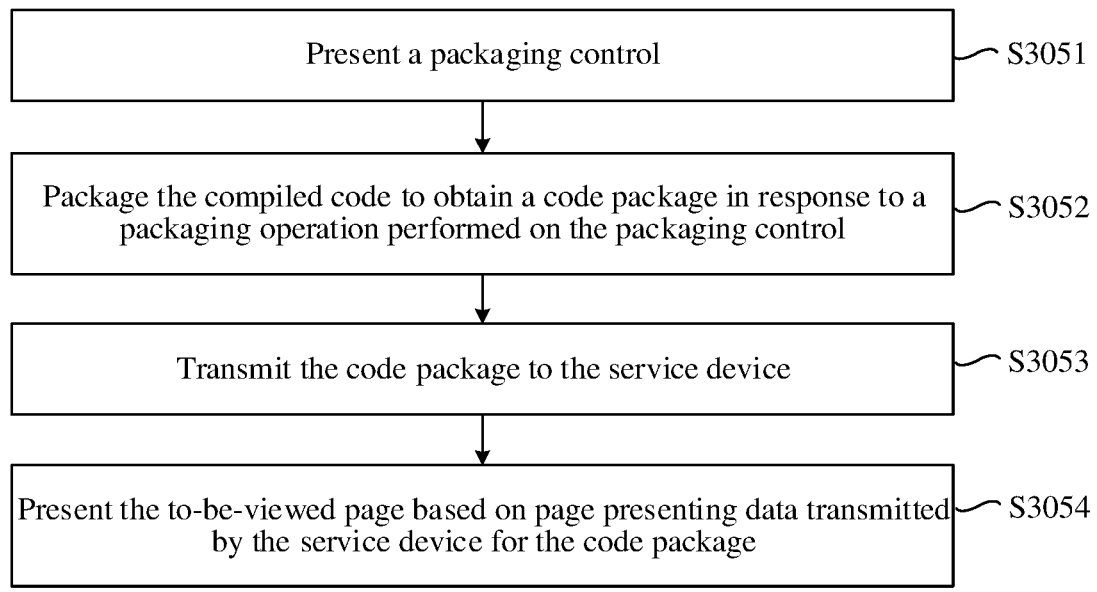
FIG. 6e is a schematic flowchart of presenting a page to be viewed according to an embodiment of this application.

Refer to FIG. 6e, which is a schematic flowchart of presenting a page to be viewed according to an embodiment of this application. As shown in FIG. 6e, in an embodiment of this application, S305 may be realized through S3051 to S3054. In other words, the presenting of the page to be viewed corresponding to the page node of the page to be compiled based on the compiled code by the page rendering device includes S3051 to S3054. The steps are described separately below.

S3051. Present a packaging control.

The packaging control is used to trigger packaging processing of the compiled code, and is, for example, a preview control or a physical device debugging control. The preview control is a control used to trigger preview processing, and the physical device debugging control is a control used to trigger physical device debugging processing.

S3052. Package the compiled code to obtain a code package in response to a packaging operation performed on the packaging control.

In an embodiment of this application, when the user triggers the preview control for preview or the user triggers the physical device debugging control for physical device debugging, the page rendering device obtains the packaging operation performed on the packaging control. The packaging operation is an operation of triggering the packaging control to package the compiled code for preview or physical device debugging. In this case, the page rendering device performs packaging processing on the compiled code in response to the packaging operation, where the packaged compiled code is the code package.

S3053. Transmit the code package to a service device.

In an embodiment of this application, after completing the packaging of the compiled code to obtain the code package, the page rendering device presents a data length of the code package to represent size information of the code package, for example, "Local compilation takes effect, code package 594 KB", also presents a file quantity of the code files to be compiled. In addition, the page rendering device further transmits the code package to the service device, so that the service device delivers data to a physical device, to realize preview or physical device debugging of the page to be viewed on the physical device. Therefore, the service device is configured to perform at least one of preview and physical device debugging based on the code package.

S3054. Present the page to be viewed based on page rendering data transmitted by the server device for the code package.

In an embodiment of this application, the service device is configured to perform target processing based on the code package to obtain the page rendering data. The target processing includes at least one of preview and physical device debugging, and the page rendering device may be a physical device. When the packaging control is the preview control, the target processing is preview. When the packaging control is the physical device debugging control, the target processing is physical device debugging. The page rendering data is used to present the page to be viewed.

It can be understood that the code file involved in the page to be viewed is compiled through the local compilation control of information, so that the local compilation is achieved while reducing the size of the code package, thereby improving the efficiency of uploading the code package, and reducing the resource consumption for uploading the code package.

In an embodiment of this application, the presenting of the page to be viewed corresponding to the page node of the page to be compiled based on the compiled code by the page rendering device includes: parsing, by the page rendering device, the compiled code to obtain page rendering data; and presenting the page to be viewed corresponding to the page node of the page to be compiled based on the page rendering data. That is to say, the page rendering device itself performs the execution of instructions corresponding to the compiled code to present the page to be viewed.

In an embodiment of this application, the page to be viewed is a subprogram page. Therefore, the application development tool is a development tool of the subprogram application, the application code file is all code files corresponding to the subprogram application, and the functional application to be developed is the subprogram application. Running of the subprogram corresponding to the subprogram page relies on a browser environment of a master program. Therefore, the subprogram can be run directly after being downloaded, and does not need to be installed.

An example application of the embodiments of this application in an actual application scenario will be described below. The example application describes preview or physical device debugging processing performed on a specified page through local compilation during the development of a mini program application.

Figure 7:
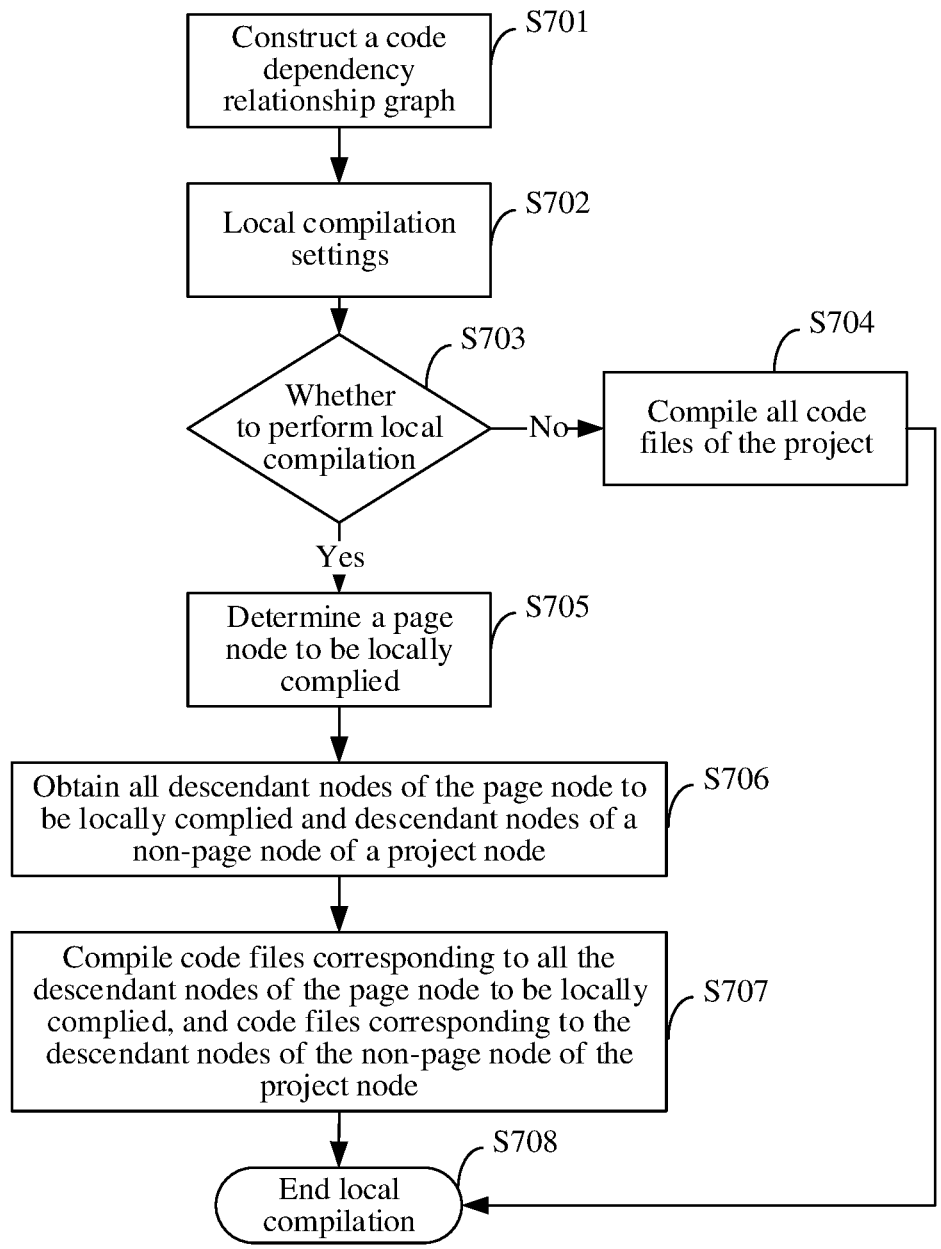
FIG. 7 is a schematic diagram of an example process of implementing information compilation according to an embodiment of this application.

Refer to FIG. 7, which is a schematic diagram of an example process of implementing information compilation according to an embodiment of this application. As shown in FIG. 7, the example process of implementing information compilation includes S701 to S708. The steps are described separately below.

S701. Construct a code dependency relationship graph (called a code dependency relationship).

The code dependency relationship graph is constructed by the analyzing a code file (called an application code file) of a mini program project (called a subprogram application). The code file of the project refers to all code files of the project, including a project configuration file "app.json" (called an application configuration file). First, all page configuration files are obtained from the project configuration file "app.json". Then, a code file with the same name as the page configuration file (called a second code file with the same name) is obtained. Finally, the code file with the same name is read to obtain a referenced code file (called a dependent code file). The code file with the same name corresponding to the page configuration file and the referenced code file are code files corresponding to the page. In addition, a code file with the same name as the project configuration file (called a first code file with the same name) is obtained. Therefore, the code dependency relationship graph is constructed based on the code files corresponding to the page and the code file with the same name as the project configuration file.

Figure 8:
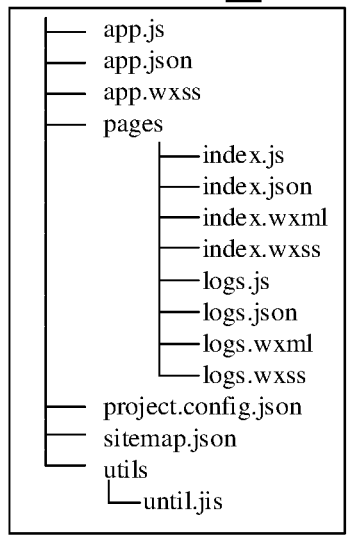
FIG. 8 is another schematic diagram of an embodiment of code file directory structure information according to an embodiment of this application.

For example, refer to FIG. 8, which is another schematic diagram of an embodiment of code file directory structure information according to an embodiment of this application. As shown in FIG. 8, in code file directory structure information 8-1 of a mini program project containing two pages, an organizational structure corresponding to the code files included therein is: "app.js"; "app.json"; "app.wxss"; "index.js", "index.json", "index.wxml", "index.wxss", "logs.js", "logs.json", "logs.wxml" and "logs.wxss" under "pages"; "project.config.json"; "sitemap.json"; and "util.js" under "utils".

Figure 9:
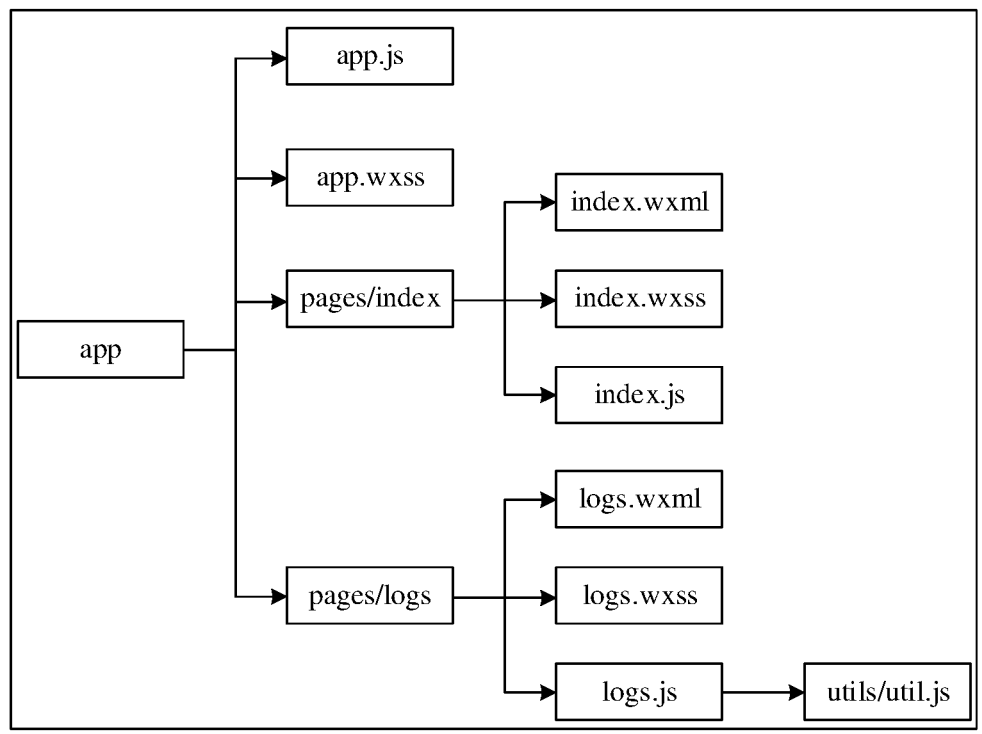
FIG. 9 is a schematic diagram of a code dependency relationship corresponding to FIG. 8 according to an embodiment of this application.

Based on FIG. 8, refer to FIG. 9, which is a schematic diagram of a code dependency relationship corresponding to FIG. 8 according to an embodiment of this application. As shown in FIG. 9, based on the directory structure shown in FIG. 8, the process of obtaining the code dependency relationship graph 9-1 includes: obtaining the project configuration file "app.json"; from the project configuration file "app.json", obtaining the page configuration files "index.json" and "logs.json"; constructing the page node "pages/index" based on the page configuration file "index.json"; obtaining the code files "index.js", "index.wxml" and "index.wxss" with the same name as the page configuration file "index.json" (called second code files with the same name); reading reference codes in the code files "index.js", "index.wxml" and "index.wxss"; determining non-referenced code files, where in this case, code nodes corresponding to the page node "pages/index" are code nodes "index.js", "index.wxml" and "index.wxss"; constructing the page node "pages/logs" based on the page configuration file "logs.json"; obtaining the code files "logs.js", "logs.wxml" and "logs.wxss" with the same name as the page configuration file "logs.json"; reading reference codes in the code files "logs.js", "logs.wxml", and "logs.wxss"; determining "util.js" (dependent code file) under the code file "untils" referenced by the code file "logs.js", where in this case, code nodes corresponding to the page node "pages/logs" are code nodes "logs.js", "logs.wxml", and "logs.wxss", and the code node "utils/util.js" corresponding to the code node "logs.js". Meanwhile, the code files "app.js" and "app.wxss" with the same name as the project configuration file "app.json" (called first code files with the same name) are obtained, to construct a project node "app" (called an application node). Nodes corresponding to the project node "app" are: code nodes "app.js" and "app.wxss", page node "pages/logs", and page node "pages/logs".

S702. Local compilation settings.

The local compilation is enabled through the local compilation settings, and a list of pages to be compiled (called page node of the pages to be compiled) is obtained.

Figure 10:
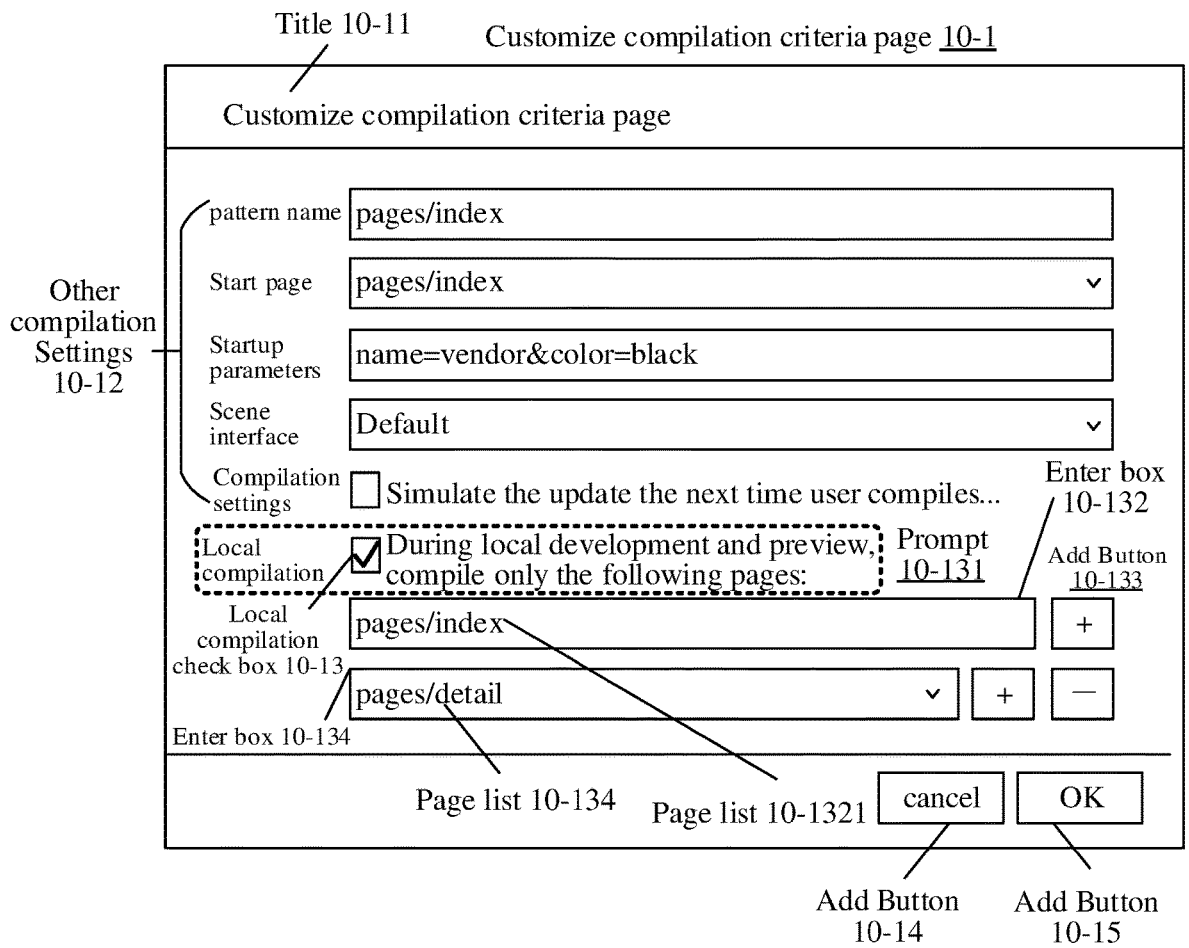
FIG. 10 is a schematic diagram of an example local compilation setting according to an embodiment of this application.

Refer to FIG. 10, which is a schematic diagram of an example local compilation setting according to an embodiment of this application. As shown in FIG. 10, in a custom compilation condition page 10-1, a title 10-11 (custom compilation condition), other compilation setting items 10-12 (mode name "pages/index", startup page "pages/index", startup parameter "name=vendor&color=black", enter scene "Default" and compilation settings), a local compilation check box 10-13 (called a local compilation switch control), a cancel button 10-14 and an OK button 10-15 are displayed. When the user selects the local compilation check box 10-13, prompt information 10-131, a page list input box 10-132 (called a local compilation control) and an add button 10-133 (called a node addition control) are displayed at the position corresponding to the selected local compilation check box 10-13 in the custom compilation condition page 10-1. A page list is inputted into the page list input box 10-132 to obtain a list of pages to be compiled. Alternatively, a page list 10-1321 ("pages/index", called a associated page node to be compiled) is inputted into the page list input box 10-132, the add button 10-133 is clicked, and a page list 10-1341 ("pages/detail", called a associated page node to be compiled) is inputted into a newly presented page list input box 10-134. In this case, the page list 10-1321 and the page list 10-1341 are lists of pages to be compiled.

S703. Determine whether to perform local compilation. If not, step S704 is performed; if yes, step S705 is performed.

If an identifier of local compilation is "1" and a list of pages to be compiled is obtained, it is determined to perform local compilation. Otherwise, it is determined to perform global compilation.

S704. Compile all code files of the project (called application code files), and perform S708.

S705. Determine a page node to be locally compiled (called a target page node).

A page node corresponding to the list of pages to be compiled is determined from the code dependency relationship graph, i.e., the page node to be locally compiled is determined.

Figure 11:
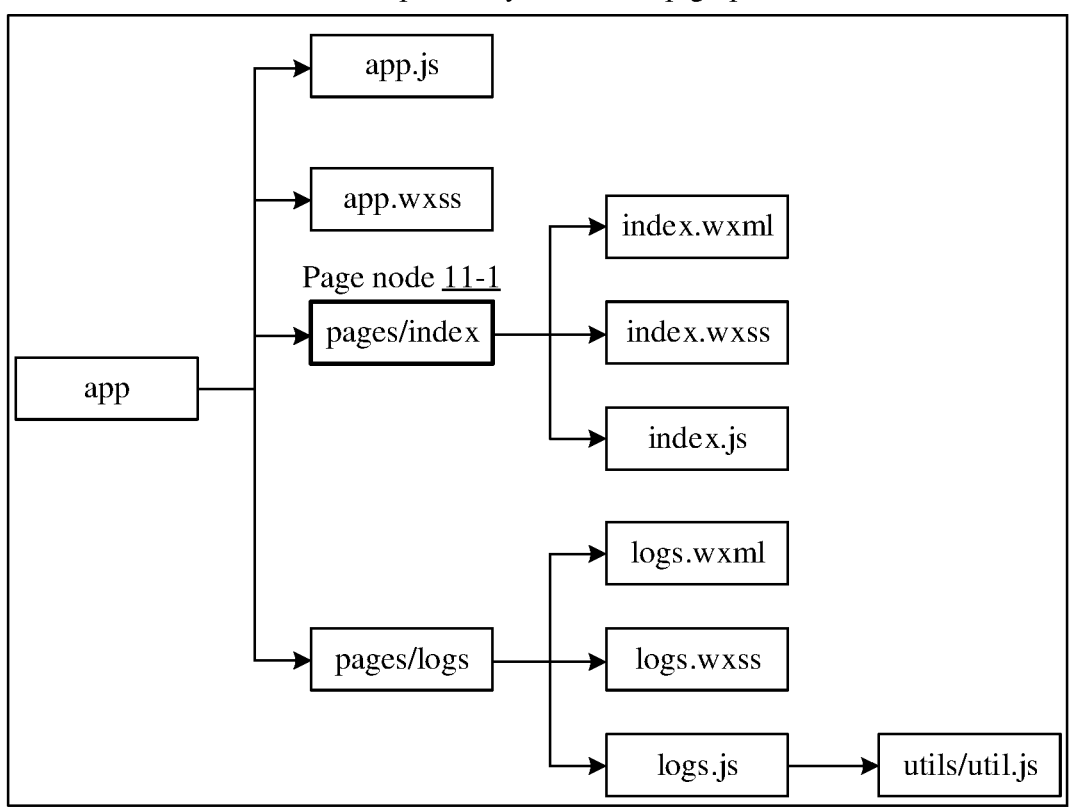
FIG. 11 is a schematic diagram of an embodiment of determining a page node to be locally compiled in FIG. 9 according to an embodiment of this application.

Refer to FIG. 11, which is a schematic diagram of an embodiment of determining a page node to be locally compiled in FIG. 9 according to an embodiment of this application. As shown in FIG. 11, based on the list of pages to be compiled inputted in FIG. 10 (taking the page list 10-1321 as an example), the page node 11-1 to be locally compiled is determined as the page node "pages/index" in the code dependency relationship graph 9-1.

S706. Obtain all descendant nodes of the page node to be locally compiled and descendant nodes of a non-page node of a project node (called an application node).

In this case, all the descendant nodes of the page node to be locally compiled and the descendant nodes of the non-page node of the project node correspond to the code nodes of the code to be compiled in the embodiments of this application.

Figure 12:
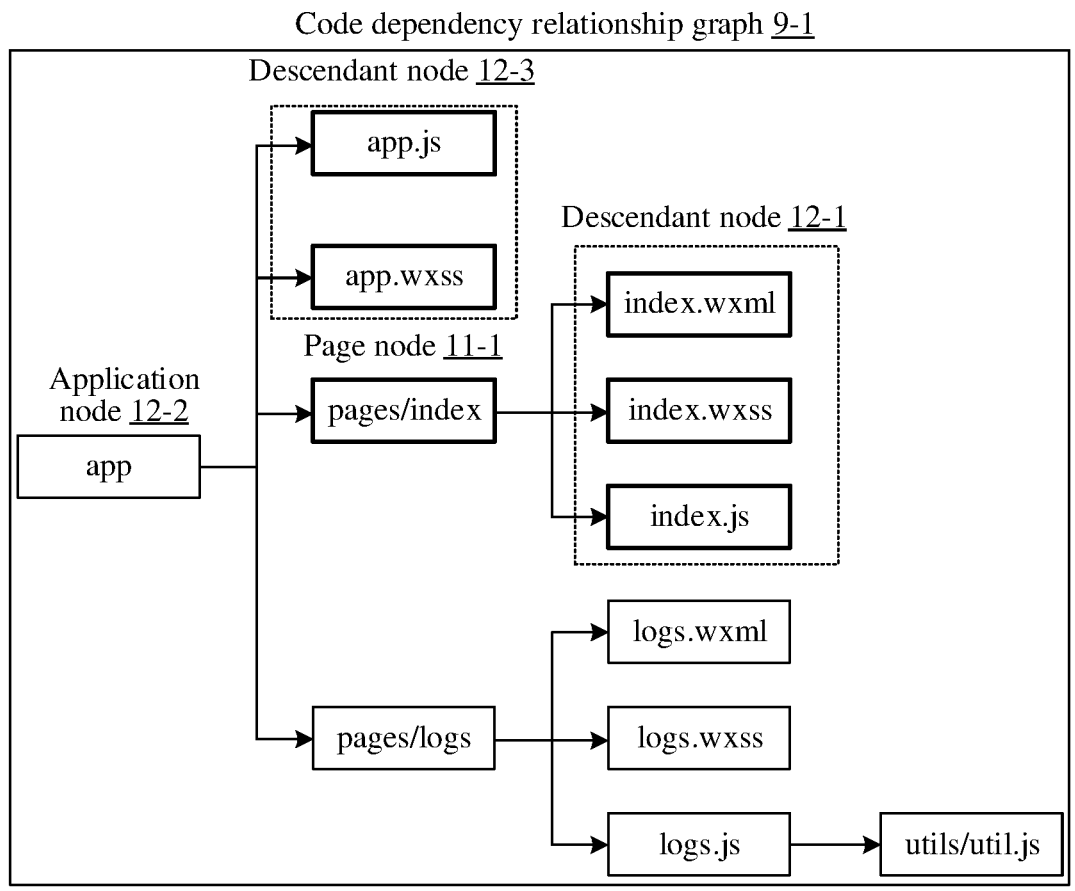
FIG. 12 is a schematic diagram of an embodiment of determining a code node of the code to be compiled in FIG. 9 according to an embodiment of this application.

Refer to FIG. 12, which is a schematic diagram of an embodiment of determining a code node of the code to be compiled in FIG. 9 according to an embodiment of this application. As shown in FIG. 12, based on the page node 11-1 to be locally compiled in FIG. 11, in the code dependency relationship graph 9-1, all the descendant nodes 12-1 of the page node 11-1 are determined, which are code nodes "index.js", "index.wxml" and "index.wxss"; and the descendant nodes 12-3 of the non-page node of the application node 12-2 are determined, which are the code nodes "app.js" and "app.wxss".

S707. Compile code files corresponding to all the descendant nodes of the page node to be locally compiled and code files corresponding to the descendant nodes of the non-page node of the project node.

The code files corresponding to all the descendant nodes of the page node to be locally compiled and the code files corresponding to the descendant nodes of the non-page node of the project node correspond to the code files to be compiled in the embodiments of this application.

Figure 13:
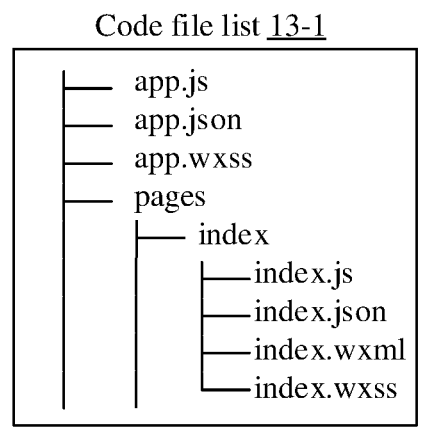
FIG. 13 is a schematic diagram of an embodiment of a code file to be compiled according to an embodiment of this application.

Refer to FIG. 13, which is a schematic diagram of an embodiment of a code file to be compiled according to an embodiment of this application. As shown in FIG. 13, a code file list 13-1 (called a code file to be compiled) is determined based on the descendant nodes 12-1 and the descendant nodes 12-3 determined in FIG. 12.

Figure 14:
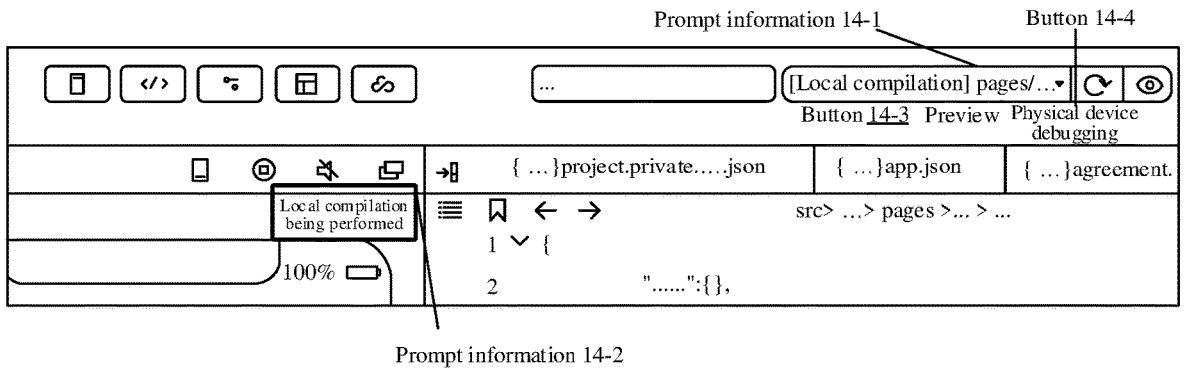
FIG. 14 is a schematic diagram of an embodiment of presenting local compilation prompt information according to an embodiment of this application.
Figure 15:
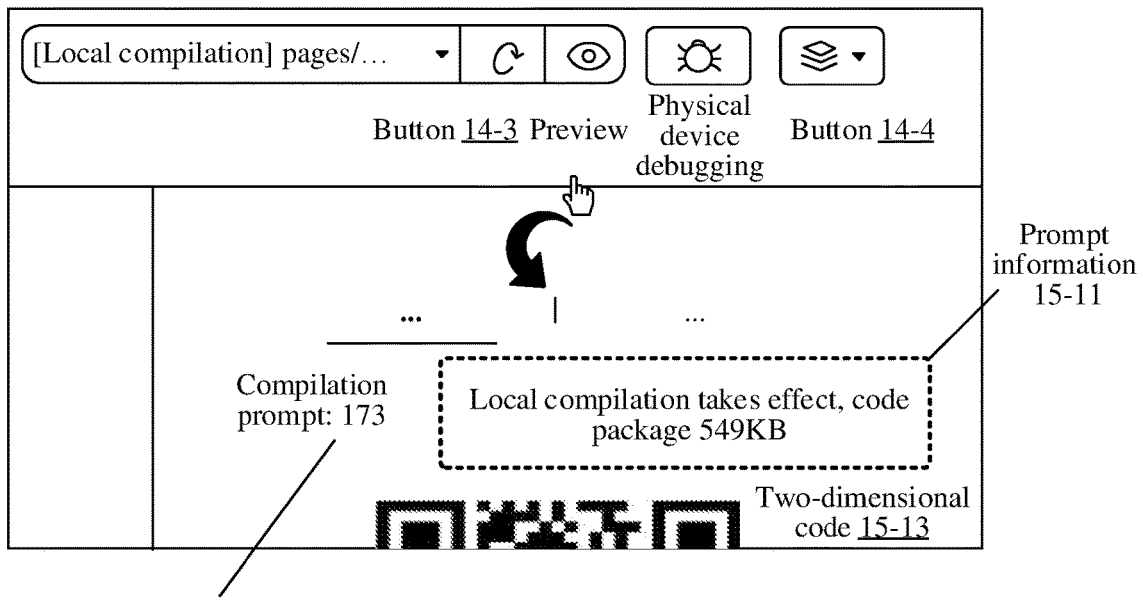
FIG. 15 is a schematic diagram of an embodiment of presenting code package size information according to an embodiment of this application.

Refer to FIG. 14, which is a schematic diagram of an embodiment of presenting local compilation prompt information according to an embodiment of this application. As shown in FIG. 14, during local compilation, prompt information 14-1 ("[Local Compilation] pages/ . . . ", corresponding to the local compilation title prompt in the embodiments of this application) is presented at a title of a page, and prompt information 14-2 ("Local compilation being performed", corresponding to the local compilation status prompt in the embodiments of this application) is presented on a development page (called the page to be viewed). Then refer to FIG. 15, which is a schematic diagram of an embodiment of presenting code package size information according to an embodiment of this application. As shown in FIG. 15, when a preview button 14-3 (called a packaging control) or physical device debugging button 14-4 (called a packaging control) in FIG. 14 is clicked, prompt information 15-11 ("Local compilation takes effect, code package 549 KB") of code package size information is presented on a page 15-1. On the page 15-1, prompt information 15-12 indicating a file quantity of the code files to be compiled ("Compilation prompt: 173") is also presented. On the page 15-1, a two-dimensional code 15-13 for preview and physical device debugging is also presented.

S708. End local compilation.

It can be understood that in the embodiments of this application, the code dependency relationship graph is constructed by analyzing the dependency relationship between the code files, and then based on the constructed code dependency relationship graph, the code file associated with the page to be previewed or debugged on a physical device is determined, so that the preview or physical device debugging of the specified page can be realized by local compilation of the code file associated with the page, thereby improving the compilation efficiency during the page rendering. In addition, compared with the result obtained by compiling all code files, local compilation reduces the size of the compiled code. In this way, when the compiled code is transferred to a back-end server, data transmission efficiency is improved and resource consumption is reduced.

An example structure of the page rendering apparatus 455 provided by the embodiments of this application embodied as software modules is described below. In some embodiments, as shown in FIG. 2, the software modules of the page rendering apparatus 455 stored in memory 450 may include:

a control presenting module 4551, configured to present a local compilation control, where the local compilation control is used for setting a page node to be locally compiled for a page to be viewed;

a node acquisition module 4552, configured to obtain a page node of the page to be compiled in response to a local compilation operation performed on the local compilation control;

a node determination module 4553, configured to obtain a code node of the code to be compiled corresponding to the page node of the page to be compiled from a code dependency relationship, the code dependency relationship being constructed based on a dependency relationship between code files, and the code dependency relationship representing a hierarchical relationship between nodes corresponding to the code files;

a code compilation module 4554, configured to compile a code file to be compiled corresponding to the code node of the code to be compiled to obtain a compiled code; and a page rendering module 4555, configured to present the page to be viewed corresponding to the page node of the page to be compiled based on the compiled code.

In an embodiment of this application, the page rendering apparatus 455 further includes a relationship construction module 4556, which is configured to read an application configuration file in an application code file to obtain a page configuration file, wherein the application code file is all code files of a functional application to be developed; obtain a first code file with the same name as the application configuration file from the application code file, and obtain a second code file with the same name as the page configuration file and a dependent code file corresponding to code reference information in the second code file with the same name; determine a page node based on a name of the page configuration file, and determine a node corresponding to the second code file with the same name and a node corresponding to the dependent code file as descendant nodes of the page node; determine an application node based on a name of the application configuration file, and determine a node corresponding to the first code file with the same name and the page node as descendant nodes of the application node; and determine the code dependency relationship according to the page node, the descendant nodes of the page node, the application node and the descendant nodes of the application node.

In an embodiment of this application, the node determination module 4553 is further configured to determine a target page node corresponding to the page node of the page to be compiled from the code dependency relationship; obtain a descendant node of the target page node from the code dependency relationship; determine a parent node of the target page node as an application node, and determine a non-page node referenced by the application node as a node corresponding to a first code file with the same name from the code dependency relationship; and determine a descendant node of the target page node and the node corresponding to the first code file with the same name as the code node of the code to be compileds.

In an embodiment of this application, the control presenting module 4551 is further configured to present a local compilation switch control, wherein the local compilation switch control is used for setting a compilation mode of a code file; and present the local compilation control in response to a local compilation enable operation performed on the local compilation switch control.

In an embodiment of this application, the control presenting module 4551 is further configured to hide the local compilation control and compile the application code file, in response to a local compilation disable operation performed on the local compilation switch control; present the page to be viewed based on the compiled application code file.

In an embodiment of this application, the code compilation module 4554 is further configured to: in response to failure in obtaining a page node based on the presented local compilation control, compile the application code file and presenting the page to be viewed based on the compiled application code file.

In an embodiment of this application, when the local compilation control includes a input control of the main node to be compiled and a node addition control, the node acquisition module 4552 is further configured to obtain the main node to be compiled in response to a main node to be compiled input operation performed on the input control of the main node to be compiled; present a input control of the associated node to be compiled in response to a node addition operation performed on the node addition control; obtain a associated page node to be compiled in response to a associated node to be compiled input operation performed on the input control of the associated node to be compiled, wherein the local compilation operation includes the main node to be compiled input operation and the node addition operation; and determine the main node to be compiled and the associated page node to be compiled as the page node of the page to be compiled.

In an embodiment of this application, the page rendering apparatus 455 further includes an information prompt module 4557, which is configured to present local compilation prompt information during compilation based on the page node of the page to be compiled, wherein the local compilation prompt information includes at least one of local compilation title prompt information and local compilation status prompt information.

In an embodiment of this application, the page rendering module 4555 is further configured to present a packaging control, where the packaging control is used to trigger packaging processing of the compiled code; package the compiled code to obtain a code package in response to a packaging operation performed on the packaging control; transmit the code package to a service device, wherein the service device is configured to perform target processing based on the code package to obtain page rendering data, and the target processing includes at least one of preview and physical device debugging; and present the page to be viewed based on the page rendering data sent by the server device for the code package.

In an embodiment of this application, the message prompt module 4557 is further configured to present the file number of the code file to be compiled and the data length of the code package.

In an embodiment of this application, the page rendering module 4555 is further configured to parse the compiled code to obtain page rendering data; and present the page to be viewed corresponding to the page node of the page to be compiled based on the page rendering data.

In an embodiment of this application, the page to be viewed is a subprogram page, and running of a subprogram corresponding to the subprogram page relies on a browser environment of a master program.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the page rendering method described above in the embodiments of this application.

An embodiment of this application provides a computer-readable storage medium storing executable instructions. When the executable instructions are executed by a processor, the processor is caused to perform the page rendering method provided in the embodiments of this application, such as the page rendering method shown in FIG. 3.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or other units suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in a plurality of collaborative files (for example, files storing one or more modules, subprograms, or code parts).

In an example, the executable instructions may be deployed to be executed on a computer device, or deployed to be executed on a plurality of computer devices at the same location, or deployed to be executed on a plurality of computer devices that are distributed in a plurality of locations and interconnected via a communication network.

In conclusion, in the embodiments of this application, the code dependency relationship is constructed by analyzing the dependency relationship between code files in advance, so that when a page is to be presented, the page to be viewed can be presented by compiling the code file that is related to the page to be viewed and obtained based on the code dependency relationship. Therefore, the number of code files that need to be compiled is reduced. Therefore, the efficiency of information compilation in the process of page rendering is improved, thereby improving the efficiency of page rendering. In addition, the number of code files that need to be packaged can be reduced and the efficiency of uploading the code package can be improved.

The foregoing descriptions are merely embodiments of this application and are not intended to limit the protection scope of this application. Any modification, equivalent replacement, or improvement made without departing from the spirit and principle of this application shall fall within the protection scope of this application.

What is claimed is:

1. A page rendering method, comprising:
    presenting a local compilation control, the local compilation control being directed to a page node to be locally compiled for a page to be viewed, the local compilation control comprising a main node input control and a node addition control;
    obtaining a node of a main page to be compiled in response to an input operation performed on the main node input control;
    presenting an associated node input control of the page to be compiled in response to a node addition operation performed on the node addition control;
    obtaining an associated page node of the page to be compiled in response to an associated node input operation performed on the associated node input control;
    determining the main page node of the page to be compiled and the associated page node of the page to be compiled as the page node of the page to be compiled;
    obtaining a code node of a code to be compiled corresponding to the page node of the page to be compiled from a code dependency relationship, the code dependency relationship being constructed based on a dependency relationship between code files, and the code dependency relationship representing a hierarchical relationship between nodes corresponding to the code files;
    compiling a code file corresponding to the code node of the code to be compiled to obtain a compiled code; and
    presenting the page to be viewed corresponding to the page node of the page to be compiled based on the compiled code.

2. The method according to claim 1, wherein the method further comprises:
    reading an application configuration file in an application code file to obtain a page configuration file, wherein the application code file is all code files of a functional application to be developed;
    obtaining a first code file with the same name as the application configuration file from the application code file, and obtaining a second code file with the same name as the page configuration file and a dependent code file corresponding to code reference information in the second code file with the same name;
    determining a page node based on a name of the page configuration file, and determining a node corresponding to the second code file with the same name and a node corresponding to the dependent code file as descendant nodes of the page node;
    determining an application node based on a name of the application configuration file, and determining a node corresponding to the first code file with the same name and the page node as descendant nodes of the application node; and
    determining the code dependency relationship according to the page node, the descendant nodes of the page node, the application node and the descendant nodes of the application node.

3. The method according to claim 1, wherein the obtaining a code node of the code to be compiled corresponding to the page node of the page to be compiled from a code dependency relationship comprises:
    determining a target page node corresponding to the page node of the page to be compiled from the code dependency relationship;
    obtaining a descendant node of the target page node from the code dependency relationship;
    determining a parent node of the target page node as an application node, and determining a non-page node referenced by the application node as a node corresponding to a first code file with the same name from the code dependency relationship; and
    determining a descendant node of the target page node and the node corresponding to the first code file with the same name as the code node of the code to be compiled.

4. The method according to claim 1, wherein the presenting the local compilation control comprises:
    presenting a local compilation switch control, wherein the local compilation switch control sets a compilation mode of a code file; and
    presenting the local compilation control in response to a local compilation enable operation performed on the local compilation switch control.

5. The method according to claim 4, wherein after the presenting the local compilation control in response to a local compilation enable operation performed on the local compilation switch control, the method further comprises:
    hiding the local compilation control and compiling the application code file in response to a local compilation disable operation performed on the local compilation switch control; and
    presenting the page to be viewed based on the compiled application code file.

6. The method according to claim 1, wherein the method further comprises:
    in response to failure in obtaining a page node based on the presented local compilation control, compiling the application code file and presenting the page to be viewed based on the compiled application code file.

7. The method according to claim 1, wherein the method further comprises:
    presenting local compilation prompt information during compilation based on the page node of the page to be compiled, wherein the local compilation prompt information comprises at least one of local compilation title prompt information and local compilation status prompt information.

8. The method according to claim 1, wherein the presenting the page to be viewed corresponding to the page node of the page to be compiled based on the compiled code comprises:
   presenting a packaging control, wherein the packaging control is used to trigger packaging processing of the compiled code;
   packaging the compiled code to obtain a code package in response to a packaging operation performed on the packaging control;
   transmitting the code package to a service device, wherein the service device is configured to perform target processing based on the code package to obtain page rendering data, and the target processing comprises at least one of preview and physical device debugging; and
   presenting the page to be viewed based on the page rendering data sent by the server device for the code package.

9. The method according to claim 8, wherein the method further comprises:
   presenting a file quantity of the code file to be compiled and a data length of the code package.

10. The method according to claim 1, wherein the presenting the page to be viewed corresponding to the page node of the page to be compiled based on the compiled code comprises:
    parsing the compiled code to obtain page rendering data; and
    presenting the page to be viewed corresponding to the page node of the page to be compiled based on the page rendering data.

11. The method according to claim 1, wherein the page to be viewed is a subprogram page, and running of a subprogram corresponding to the subprogram page relies on a browser environment of a master program.

12. An electronic device for page rendering, comprising:
    a memory, storing executable instructions; and
    a processor, configured to, by executing the executable instructions stored in the memory, implement:
      presenting a local compilation control, the local compilation control being directed to a page node to be locally compiled for a page to be viewed, the local compilation control comprising a main node input control and a node addition control;
      obtaining a node of a main page to be compiled in response to an input operation performed on the main node input control;
      presenting an associated node input control of the page to be compiled in response to a node addition operation performed on the node addition control;
      obtaining an associated page node of the page to be compiled in response to an associated node input operation performed on the associated node input control;
      determining the main page node of the page to be compiled and the associated page node of the page to be compiled as the page node of the page to be compiled;
      obtaining a code node of a code to be compiled corresponding to the page node of the page to be compiled from a code dependency relationship, the code dependency relationship being constructed based on a dependency relationship between code files, and the code dependency relationship representing a hierarchical relationship between nodes corresponding to the code files;
      compiling a code file corresponding to the code node of the code to be compiled to obtain a compiled code; and
      presenting the page to be viewed corresponding to the page node of the page to be compiled based on the compiled code.

13. The electronic device according to claim 12, wherein the processor is further configured to implement:
    reading an application configuration file in an application code file to obtain a page configuration file, wherein the application code file is all code files of a functional application to be developed;
    obtaining a first code file with the same name as the application configuration file from the application code file, and obtaining a second code file with the same name as the page configuration file and a dependent code file corresponding to code reference information in the second code file with the same name;
    determining a page node based on a name of the page configuration file, and determining a node corresponding to the second code file with the same name and a node corresponding to the dependent code file as descendant nodes of the page node;
    determining an application node based on a name of the application configuration file, and determining a node corresponding to the first code file with the same name and the page node as descendant nodes of the application node; and
    determining the code dependency relationship according to the page node, the descendant nodes of the page node, the application node and the descendant nodes of the application node.

14. The electronic device according to claim 12, wherein the obtaining a code node of the code to be compiled corresponding to the page node of the page to be compiled from a code dependency relationship comprises:
    determining a target page node corresponding to the page node of the page to be compiled from the code dependency relationship;
    obtaining a descendant node of the target page node from the code dependency relationship;
    determining a parent node of the target page node as an application node, and determining a non-page node referenced by the application node as a node corresponding to a first code file with the same name from the code dependency relationship; and
    determining a descendant node of the target page node and the node corresponding to the first code file with the same name as the code node of the code to be compiled.

15. The electronic device according to claim 12, wherein the presenting a local compilation control comprises:
    presenting a local compilation switch control, wherein the local compilation switch control sets a compilation mode of a code file; and
    presenting the local compilation control in response to a local compilation enable operation performed on the local compilation switch control.

16. The electronic device according to claim 15, wherein the processor is further configured to implement:
    hiding the local compilation control and compiling the application code file in response to a local compilation disable operation performed on the local compilation switch control; and presenting the page to be viewed based on the compiled application code file.

17. A non-transitory computer-readable storage medium, storing executable instructions, when executed by a processor, causing the processor to implement:
  presenting a local compilation control, the local compilation control being directed to a page node to be locally compiled for a page to be viewed, the local compilation control comprising a main node input control and a node addition control;
  obtaining a node of a main page to be compiled in response to an input operation performed on the main node input control;
  presenting an associated node input control of the page to be compiled in response to a node addition operation performed on the node addition control;
  obtaining an associated page node of the page to be compiled in response to an associated node input operation performed on the associated node input control;
  determining the main page node of the page to be compiled and the associated page node of the page to be compiled as the page node of the page to be compiled;
  obtaining a code node of a code to be compiled corresponding to the page node of the page to be compiled from a code dependency relationship, the code dependency relationship being constructed based on a dependency relationship between code files, and the code dependency relationship representing a hierarchical relationship between nodes corresponding to the code files;
  compiling a code file corresponding to the code node of the code to be compiled to obtain a compiled code; and
  presenting the page to be viewed corresponding to the page node of the page to be compiled based on the compiled code.

18. The computer-readable storage medium according to claim 17, wherein the executable instructions further cause the processor to implement:
  reading an application configuration file in an application code file to obtain a page configuration file, wherein the application code file is all code files of a functional application to be developed;
  obtaining a first code file with the same name as the application configuration file from the application code file, and obtaining a second code file with the same name as the page configuration file and a dependent code file corresponding to code reference information in the second code file with the same name;
  determining a page node based on a name of the page configuration file, and determining a node corresponding to the second code file with the same name and a node corresponding to the dependent code file as descendant nodes of the page node;
  determining an application node based on a name of the application configuration file, and determining a node corresponding to the first code file with the same name and the page node as descendant nodes of the application node; and
  determining the code dependency relationship according to the page node, the descendant nodes of the page node, the application node and the descendant nodes of the application node.

19. The computer-readable storage medium according to claim 17, wherein the obtaining a code node of the code to be compiled corresponding to the page node of the page to be compiled from a code dependency relationship comprises:
  determining a target page node corresponding to the page node of the page to be compiled from the code dependency relationship;
  obtaining a descendant node of the target page node from the code dependency relationship;
  determining a parent node of the target page node as an application node, and determining a non-page node referenced by the application node as a node corresponding to a first code file with the same name from the code dependency relationship; and
  determining a descendant node of the target page node and the node corresponding to the first code file with the same name as the code node of the code to be compiled.

* * * * *